(12) United States Patent
Chen et al.

(10) Patent No.: US 11,646,830 B2
(45) Date of Patent: May 9, 2023

(54) POLAR CODE CONSTRUCTION FOR INCREMENTAL REDUNDANCY

(71) Applicant: Qualcomm Incorporated, San Diego, CA (US)

(72) Inventors: Kai Chen, Shenzhen (CN); Jian Li, Beijing (CN); Changlong Xu, Beijing (CN); Liangming Wu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 17/054,917

(22) PCT Filed: May 28, 2019

(86) PCT No.: PCT/CN2019/088742
§ 371 (c)(1),
(2) Date: Nov. 12, 2020

(87) PCT Pub. No.: WO2019/228325
PCT Pub. Date: Dec. 5, 2019

(65) Prior Publication Data
US 2021/0234639 A1    Jul. 29, 2021

(30) Foreign Application Priority Data

May 28, 2018 (WO) ................ PCT/CN2018/088658

(51) Int. Cl.
*H04L 1/18* (2006.01)
*H04L 1/00* (2006.01)
(Continued)

(52) U.S. Cl.
CPC .......... *H04L 1/1819* (2013.01); *H04L 1/0057* (2013.01); *H04L 1/0069* (2013.01); *H04L 1/1861* (2013.01); *H04L 5/0051* (2013.01)

(58) Field of Classification Search
CPC ... H04L 1/1819; H04L 1/1816; H04L 1/1812; H04L 1/1861; H04L 1/1858;
(Continued)

(56) References Cited

U.S. PATENT DOCUMENTS

2018/0115393 A1   4/2018 Zhang et al.
2019/0058490 A1*  2/2019 Klein ................... H03M 13/13
(Continued)

FOREIGN PATENT DOCUMENTS

CN    103281166 A  *  9/2013 ........... H04L 1/0057
CN    105743621 A  *  7/2016 ............ H03M 13/13
(Continued)

OTHER PUBLICATIONS

International Search Report and Written Opinion—PCT/CN2018/088658—ISA/EPO—dated Feb. 20, 2019.
(Continued)

*Primary Examiner* — Phong La
(74) *Attorney, Agent, or Firm* — Holland & Hart LLP/Qualcomm Incorporated

(57) ABSTRACT

A device may identify that an incremental redundancy hybrid automatic repeat request (IR-HARQ) scheme is used in association with sequential transmissions of an information bit vector to or from another wireless device, where each transmission in the scheme is associated with a resource size. The device may identify a mother code length for a polar code based at least in part on an aggregate resource size associated with the sequential transmissions. The device may identify an adjusted bit index set for the polar code based at least in part on the IR-HARQ scheme. The device may transmit (or receive), for each transmission of the information bit vector, a respective subset of encoded
(Continued)

bits generated by mapping the information bit vector to a set of polarized bit channels of the polar code in accordance with the bit index set.

30 Claims, 15 Drawing Sheets

(51) Int. Cl.
*H04L 5/00* (2006.01)
*H04L 1/1812* (2023.01)
*H04L 1/1829* (2023.01)

(58) Field of Classification Search
CPC ... H04L 1/1864; H04L 1/0057; H04L 1/0056; H04L 1/0061; H04L 1/0064; H04L 1/0069; H04L 5/0051; H04L 5/005
See application file for complete search history.

(56) References Cited

U.S. PATENT DOCUMENTS

| | | | |
|---|---|---|---|
| 2019/0215105 A1* | 7/2019 | Xu | H04L 1/0009 |
| 2020/0099469 A1* | 3/2020 | Jiang | H03M 13/13 |
| 2020/0228259 A1* | 7/2020 | Hwang | H04L 5/0055 |
| 2020/0304241 A1* | 9/2020 | Noh | H04L 1/0041 |
| 2021/0203450 A1* | 7/2021 | Xu | H04L 1/1819 |
| 2021/0234639 A1* | 7/2021 | Chen | H04L 1/1861 |
| 2022/0045893 A1* | 2/2022 | Yamada | H04L 27/26136 |

FOREIGN PATENT DOCUMENTS

| | | | |
|---|---|---|---|
| CN | 106817195 A | 6/2017 | |
| CN | 107666369 A | 2/2018 | |
| CN | 109756307 A * | 5/2019 | ............ H03M 13/13 |
| WO | WO-2017092543 A1 * | 6/2017 | ............ H03M 13/13 |

OTHER PUBLICATIONS

International Search Report and Written Opinion—PCT/CN2019/088742—ISA/EPO—dated Aug. 15, 2019.
Saber H., et al., "An Incremental Redundancy Hybrid ARQ Scheme via Puncturing and Extending of Polar Codes", IEEE Transactions on Communications, Nov. 30, 2015, vol. 63, No. 11, pp. 3964-3973.
Huawei, et al., "HARQ Scheme for Polar Codes," 3GPP Draft, 3GPP TSG RAN WG1 Meeting #87, R1-1613301, HARQ Scheme for Polar Codes, 3rd Generation Partnership Project (3GPP), Mobile Competence Centre, 650, Route Des Lucioles F-06921 Sophia-Antipolis Cedex, France, vol. RAN WG1, No. Reno, USA, Nov. 14, 2016-Nov. 18, 2016, Nov. 19, 2016, XP051191170, 41 Pages, Retrieved from the Internet: URL: http://www.3gpp.org/ftp/tsg_ran/WG1_RL1/TSGR1_87/Docs/ [retrieved on Nov. 19, 2016], Section 2, figures 4,5, [Lines 4 to 5 of p. 2 and Lines 1 to 2 of p. 3], Section 2.2 "Incremental Redundancy HARQ Design", pp. 3-8, figures 5-7, Section 2.1 "Incremental Freezing HARQ design", pp. 1-3, Section 2.
Ma L., et al., "An Incremental Redundancy HARQ Scheme for Polar Code", Aug. 31, 2017 (Aug. 31, 2017), pp. 1-6, XP055449712, Retrieved from the Internet: URL: https://arxiv.org/pdf/1708.09679.pdf [retrieved on Feb. 9, 2018] Section 3 "IR-HARQ for polar code", pp. 2-4, Figures 2,3, The whole document.
Supplementary European Search Report—EP19811117—Search Authority—Munich—dated Feb. 1, 2022.

* cited by examiner

POLAR CODE CONSTRUCTION FOR INCREMENTAL REDUNDANCY

CROSS REFERENCES

The present Application for Patent claims priority to International Patent Application No. PCT/CN2019/088742 by Chen et. al., entitled "POLAR CODE CONSTRUCTION FOR INCREMENTAL REDUNDANCY," filed May 28, 2019; and to International Patent Application No. PCT/CN2018/088658 by Chen et. al., entitled "POLAR CODE CONSTRUCTION FOR INCREMENTAL REDUNDANCY," filed May 28, 2018, each of which is assigned to the assignee hereof and each of which is hereby incorporated by reference in its entirety.

BACKGROUND

The following relates generally to wireless communications, and more specifically to polar code construction for incremental redundancy.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, wireless communications between a UE and base station may fail, for example, due to degraded channel conditions, increased interference, etc. Techniques, such as coding schemes and hybrid automatic repeat request (HARQ) operations, may be used by wireless devices to increase the reliability of wireless communications. In some examples, a transmitting wireless device encodes information bits intended for another wireless device and transmits the encoded bits to the other wireless device. As an example of such an encoding operation, polar encoding may increase the likelihood that the information bits are successfully received at the other wireless device since each encoded bit may provide additional information for decoding one or more other encoded bits.

SUMMARY

The described techniques relate to improved methods, systems, devices, and apparatuses that support polar code construction for incremental redundancy. Some wireless communications may benefit from retransmissions which are at least partially redundant with one or more preceding transmissions. For example, an incremental redundancy hybrid automatic repeat request (IR-HARQ) scheme may utilize sequential transmissions of encoded bits (e.g., obtained using different puncturing configurations), where each transmission may provide at least some level of redundancy to the preceding transmission(s). Combining the transmissions (e.g., soft combination of bit metrics) may improve a decodability of an encoded information bit vector. However, for polar decoding operations, soft combination across codewords may produce discrepancies in the decoding operation itself (because the different levels of redundancy may alter one or more channel metrics of the polar decoding operation). For example, information bit indices that are reliable for a codeword of length M may not be as reliable (relative to other bit indices) for a codeword of length 2M.

Aspects of the present disclosure relate to selecting an adjusted information bit index set that supports IR-HARQ operations. For example, the adjusted information bit index set may be determined based on comparisons between reference information bit index sets for multiple different mother codeword lengths (where each different mother codeword length may be based at least in part on a combination of one or more IR-HARQ transmission resource sizes). Information bit indices which appear in multiple reference information bit index sets may be included as a first subset of bits in the adjusted information bit index set while one or more bit indices which are not common to all reference information bit index sets may comprise a second subset of bits in the adjusted information bit index set. In aspects of the present disclosure, the first subset of bits may be referred to as common information bit indices while the second subset of bits may be referred to as difference information bit indices. In some cases, the distribution of the difference information bit indices (e.g., the contribution of each reference information bit index set) in the adjusted information bit index set may be based on a type of information in the transmission, channel quality metrics, and other such factors. A transmitting device may transmit one or more codewords encoded using a polar code according to the adjusted information bit index set. For example, each codeword may represent a different subset of the coded bits generated by the polar code. In some cases, the transmitting device may apply a puncturing code to the coded bits to generate the transmitted codewords.

A receiving device may combine multiple codewords to generate decoding candidates for the polar operation. For example, each decoding attempt may be associated with a polar operation having a mother codeword length that is longer than an aggregate of the resource sizes for all codewords associated with the IR-HARQ scheme. Each retransmission may provide additional information for decoding candidates, which may increase the likelihood of successfully decoding the information bit vector. The described techniques may provide a flexible code construction for polar IR-HARQ operations and may in some cases provide a better tradeoff between performance of an initial transmission and the following retransmissions.

A method of wireless communication is described. The method may include identifying that an IR-HARQ scheme is used in association with sequential transmissions of an information bit vector from a wireless device, where each transmission in the IR-HARQ scheme is associated with a resource size, identifying a mother code length for a polar code used in association with the IR-HARQ scheme based on an aggregate resource size associated with the sequential transmissions, identifying a bit index set for the polar code based on identifying that the IR-HARQ scheme is used, and receiving, for each transmission of the information bit vector, a respective subset of encoded bits generated by mapping the information bit vector to a set of polarized bit channels of the polar code in accordance with the bit index set.

An apparatus for wireless communication is described. The apparatus may include a processor, memory in electronic communication with the processor, and instructions stored in the memory. The instructions may be executable by the processor to cause the apparatus to identify that an IR-HARQ scheme is used in association with sequential transmissions of an information bit vector from a wireless device, where each transmission in the IR-HARQ scheme is associated with a resource size, identify a mother code length for a polar code used in association with the IR-HARQ scheme based on an aggregate resource size associated with the sequential transmissions, identify a bit index set for the polar code based on the IR-HARQ scheme, and receive, for each transmission of the information bit vector, a respective subset of encoded bits generated by mapping the information bit vector to a set of polarized bit channels of the polar code in accordance with the bit index set.

Another apparatus for wireless communication is described. The apparatus may include means for identifying that an IR-HARQ scheme is used in association with sequential transmissions of an information bit vector from a wireless device, where each transmission in the IR-HARQ scheme is associated with a resource size, identifying a mother code length for a polar code used in association with the IR-HARQ scheme based on an aggregate resource size associated with the sequential transmissions, identifying a bit index set for the polar code based on identifying that the IR-HARQ scheme is used, and receiving, for each transmission of the information bit vector, a respective subset of encoded bits generated by mapping the information bit vector to a set of polarized bit channels of the polar code in accordance with the bit index set.

A non-transitory computer-readable medium storing code for wireless communication is described. The code may include instructions executable by a processor to identify that an IR-HARQ scheme is used in association with sequential transmissions of an information bit vector from a wireless device, where each transmission in the IR-HARQ scheme is associated with a resource size, identify a mother code length for a polar code used in association with the IR-HARQ scheme based on an aggregate resource size associated with the sequential transmissions, identify a bit index set for the polar code based on the IR-HARQ scheme, and receive, for each transmission of the information bit vector, a respective subset of encoded bits generated by mapping the information bit vector to a set of polarized bit channels of the polar code in accordance with the bit index set.

In some examples of the method, apparatuses, and non-transitory computer-readable medium described herein, identifying the bit index set for the polar code may include operations, features, means, or instructions for selecting the bit index set from a set of candidate bit index sets based on a vector length of the information bit vector, the mother code length, or a combination thereof.

In some examples of the method, apparatuses, and non-transitory computer-readable medium described herein, receiving, for each transmission of the information bit vector, the respective subset of encoded bits may include operations, features, means, or instructions for receiving a first subset of the encoded bits from the wireless device, transmitting, to the wireless device, an indication that a decoding of the first subset of encoded bits was unsuccessful, receiving a second subset of the encoded bits from the wireless device and decoding the information bit vector based on the first and second subsets.

Some examples of the method, apparatuses, and non-transitory computer-readable medium described herein may further include operations, features, means, or instructions for generating a set of candidate bit vectors, each candidate bit vector based on one or more subsets and attempting to decode the information bit vector in accordance with the bit index set by applying the polar code to each candidate bit vector.

In some examples of the method, apparatuses, and non-transitory computer-readable medium described herein, identifying that the IR-HARQ scheme may be used in association with sequential transmission of the information bit vector may include operations, features, means, or instructions for identifying a number of HARQ processes supported by the IR-HARQ scheme, where the aggregate resource size associated with the sequential transmissions may be based on the number of HARQ processes.

In some examples of the method, apparatuses, and non-transitory computer-readable medium described herein, the bit index set may be based on a set of reference bit index sets, each reference bit index corresponding to a respective mother code length that may be based on the resource size of one or more of the transmissions.

In some examples of the method, apparatuses, and non-transitory computer-readable medium described herein, the bit index set includes a common set of bit indices that may be common to each of the set of reference bit index sets and a distribution of bit indices from difference sets, each difference set specific to a respective reference bit index set of the set of reference bit index sets.

In some examples of the method, apparatuses, and non-transitory computer-readable medium described herein, the common set of bit indices may be identified based on normalizing each of the set of reference bit index sets to may have a same set size.

In some examples of the method, apparatuses, and non-transitory computer-readable medium described herein, the distribution of bit indices from the difference sets may be based on a priority ranking of the sequential transmissions.

In some examples of the method, apparatuses, and non-transitory computer-readable medium described herein, a first reference bit index set corresponds to a first polar code length that may be based on the resource size associated with a first transmission and a second reference bit index set corresponds to a second polar code length that may be based on an aggregation of the resource size associated with the first transmission and the resource size associated with a second transmission.

Some examples of the method, apparatuses, and non-transitory computer-readable medium described herein may further include operations, features, means, or instructions for identifying a resource size associated with a first transmission and a number of bits in the information bit vector and identifying a first reference bit index set corresponding to a first polar code length based on the resource size and the number of bits in the information bit vector.

Some examples of the method, apparatuses, and non-transitory computer-readable medium described herein may further include operations, features, means, or instructions for identifying a communication type associated with the information bit vector, where the bit index set may be based on the communication type.

In some examples of the method, apparatuses, and non-transitory computer-readable medium described herein, a first subset of the encoded bits may have a same bit length as a second subset of the encoded bits.

In some examples of the method, apparatuses, and non-transitory computer-readable medium described herein, the resource size associated with a first transmission may be different from the resource size associated with a second transmission.

A method of wireless communication is described. The method may include identifying that an IR-HARQ scheme is used in association with sequential transmissions of an information bit vector to a wireless device, where each transmission in the IR-HARQ scheme is associated with a resource size, identifying a mother code length for a polar code used in association with the IR-HARQ scheme based on an aggregate resource size associated with the sequential transmissions, identifying a bit index set for the polar code based on identifying that the IR-HARQ scheme is used, and transmitting, for each transmission of the information bit vector, a respective subset of encoded bits generated by mapping the information bit vector to a set of polarized bit channels of the polar code in accordance with the bit index set.

An apparatus for wireless communication is described. The apparatus may include a processor, memory in electronic communication with the processor, and instructions stored in the memory. The instructions may be executable by the processor to cause the apparatus to identify that an IR-HARQ scheme is used in association with sequential transmissions of an information bit vector to a wireless device, where each transmission in the IR-HARQ scheme is associated with a resource size, identify a mother code length for a polar code used in association with the IR-HARQ scheme based on an aggregate resource size associated with the sequential transmissions, identify a bit index set for the polar code based on the IR-HARQ scheme, and transmit, for each transmission of the information bit vector, a respective subset of encoded bits generated by mapping the information bit vector to a set of polarized bit channels of the polar code in accordance with the bit index set.

Another apparatus for wireless communication is described. The apparatus may include means for identifying that an IR-HARQ scheme is used in association with sequential transmissions of an information bit vector to a wireless device, where each transmission in the IR-HARQ scheme is associated with a resource size, identifying a mother code length for a polar code used in association with the IR-HARQ scheme based on an aggregate resource size associated with the sequential transmissions, identifying a bit index set for the polar code based on identifying that the IR-HARQ scheme is used, and transmitting, for each transmission of the information bit vector, a respective subset of encoded bits generated by mapping the information bit vector to a set of polarized bit channels of the polar code in accordance with the bit index set.

A non-transitory computer-readable medium storing code for wireless communication is described. The code may include instructions executable by a processor to identify that an IR-HARQ scheme is used in association with sequential transmissions of an information bit vector to a wireless device, where each transmission in the IR-HARQ scheme is associated with a resource size, identify a mother code length for a polar code used in association with the IR-HARQ scheme based on an aggregate resource size associated with the sequential transmissions, identify a bit index set for the polar code based on the IR-HARQ scheme, and transmit, for each transmission of the information bit vector, a respective subset of encoded bits generated by mapping the information bit vector to a set of polarized bit channels of the polar code in accordance with the bit index set.

In some examples of the method, apparatuses, and non-transitory computer-readable medium described herein, identifying the bit index set for the polar code may include operations, features, means, or instructions for selecting the bit index set from a set of candidate bit index sets based on a vector length of the information bit vector, the mother code length, or a combination thereof.

In some examples of the method, apparatuses, and non-transitory computer-readable medium described herein, transmitting, for each transmission of the information bit vector, the respective subset of encoded bits may include operations, features, means, or instructions for transmitting a first subset of the encoded bits to the wireless device, receiving, from the wireless device, an indication that a decoding of the first subset of encoded bits was unsuccessful and transmitting a second subset of the encoded bits to the wireless device.

In some examples of the method, apparatuses, and non-transitory computer-readable medium described herein, transmitting, for each transmission of the information bit vector, the respective subset of encoded bits may include operations, features, means, or instructions for generating each subset of encoded bits by applying a respective puncturing pattern to the encoded bits.

In some examples of the method, apparatuses, and non-transitory computer-readable medium described herein, identifying that the IR-HARQ scheme may be used in association with sequential transmission of the information bit vector may include operations, features, means, or instructions for identifying a number of HARQ processes supported by the IR-HARQ scheme, where the aggregate resource size associated with the sequential transmissions may be based on the number of HARQ processes.

In some examples of the method, apparatuses, and non-transitory computer-readable medium described herein, the bit index set may be based on a set of reference bit index sets, each reference bit index corresponding to a respective mother code length that may be based on the resource size of one or more of the transmissions.

In some examples of the method, apparatuses, and non-transitory computer-readable medium described herein, the bit index set includes a common set of bit indices that may be common to each of the set of reference bit index sets and a distribution of bit indices from difference sets, each difference set specific to a respective reference bit index set of the set of reference bit index sets.

In some examples of the method, apparatuses, and non-transitory computer-readable medium described herein, the common set of bit indices may be identified based on normalizing each of the set of reference bit index sets to may have a same set size.

In some examples of the method, apparatuses, and non-transitory computer-readable medium described herein, the distribution of bit indices from the difference sets may be based on a priority ranking of the sequential transmissions.

In some examples of the method, apparatuses, and non-transitory computer-readable medium described herein, a first reference bit index set corresponds to a first polar code length that may be based on the resource size associated with a first transmission and a second reference bit index set corresponds to a second polar code length that may be based on an aggregation of the resource size associated with the first transmission and the resource size associated with a second transmission.

Some examples of the method, apparatuses, and non-transitory computer-readable medium described herein may further include operations, features, means, or instructions for identifying a resource size associated with a first transmission and a number of bits in the information bit vector and identifying a first reference bit index set corresponding to a first polar code length based on the resource size and the number of bits in the information bit vector.

Some examples of the method, apparatuses, and non-transitory computer-readable medium described herein may further include operations, features, means, or instructions for identifying a communication type associated with the information bit vector, where the bit index set may be based on the communication type.

In some examples of the method, apparatuses, and non-transitory computer-readable medium described herein, a first subset of the encoded bits may have a same bit length as a second subset of the encoded bits.

In some examples of the method, apparatuses, and non-transitory computer-readable medium described herein, the resource size associated with a first transmission may be different from the resource size associated with a second transmission.

DETAILED DESCRIPTION

Polar encoding may involve identifying a set of preferred bit positions after a channel polarization transform and loading information bits on these bit positions. The mother code length of a polar code may be restricted to powers of 2, for example, because of the nature of the encoding operation. However, the practical code length (the bit-length of the transmitted codeword) may be selected to fit a given resource size. For example, rate-matching (e.g., puncturing, shortening, bit-repetition) may be used to adjust the mother code length to the practical code length. The mother code length and the set of bit positions for the information bits may be determined based on a payload size (a bit length of an information bit vector) and a resource size for the codeword.

In accordance with aspects of the present disclosure, a polar IR-HARQ scheme may utilize a mother codeword having a length that is greater than an aggregate of the resource sizes associated with various IR-HARQ transmissions. An adjusted information bit index set may be determined based on multiple reference bit index sets, each of which may be associated with a codeword that is shorter than or the same length as the mother codeword. For example, each reference bit index set may correspond to the effective codeword size of the combined codewords following each retransmission. The described techniques may, for example, provide for a better tradeoff between the performance of an initial transmission and the following retransmissions by distributing information bit indices across a subset of reliable positions associated with each codeword size.

Aspects of the disclosure are initially described in the context of a wireless communications system. Aspects of the disclosure are then illustrated by and described with reference to encoding and decoding operations. Aspects of the disclosure are further illustrated by and described with reference to apparatus diagrams, system diagrams, and flowcharts that relate to polar code construction for incremental redundancy.

Figure 1:
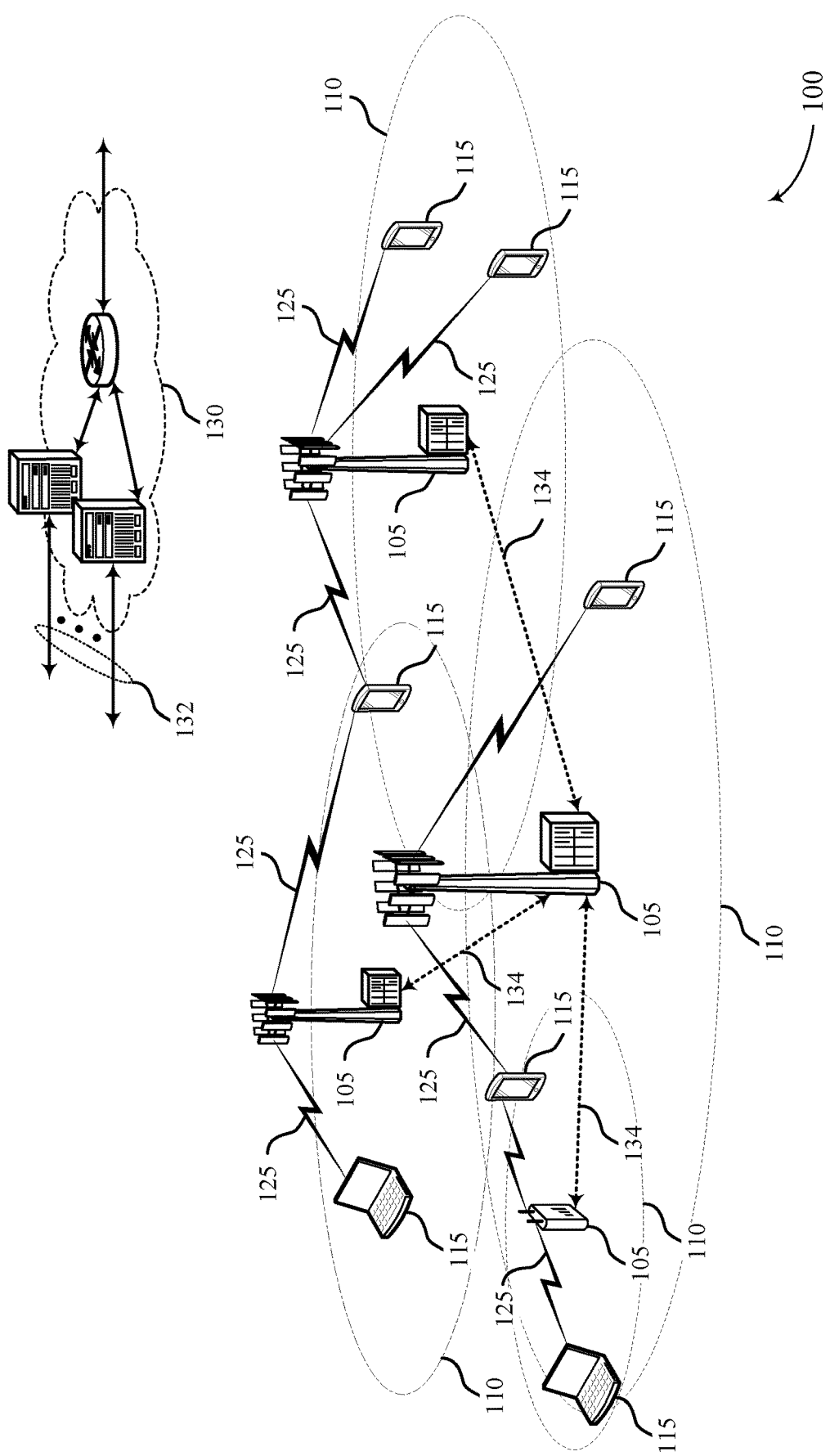
FIG. 1 illustrates an example of a system for wireless communications that supports polar code construction for incremental redundancy in accordance with aspects of the present disclosure.

FIG. 1 illustrates an example of a wireless communications system 100 that supports polar code construction for incremental redundancy in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A transmitting device (e.g., a base station 105 or a UE 115) may generate a mother codeword of size N using a polar code based on an adjusted information bit index set, where bits of an information bit vector are fed to the polar code in accordance with the adjusted information bit index set. The transmitting device may transmit a first codeword (a first subset of the encoded bits selected according to some puncturing pattern) to a receiving device (e.g., a UE 115 or base station 105). The transmitting device may determine that the first codeword was not successfully received and prepare a retransmission according to an IR-HARQ scheme. The transmitting device may generate a second codeword (a second subset of the encoded bits selected according to another puncturing pattern). The receiving device may decode the information bit vector based at least in part on the first codeword and the second codeword.

Figure 2:
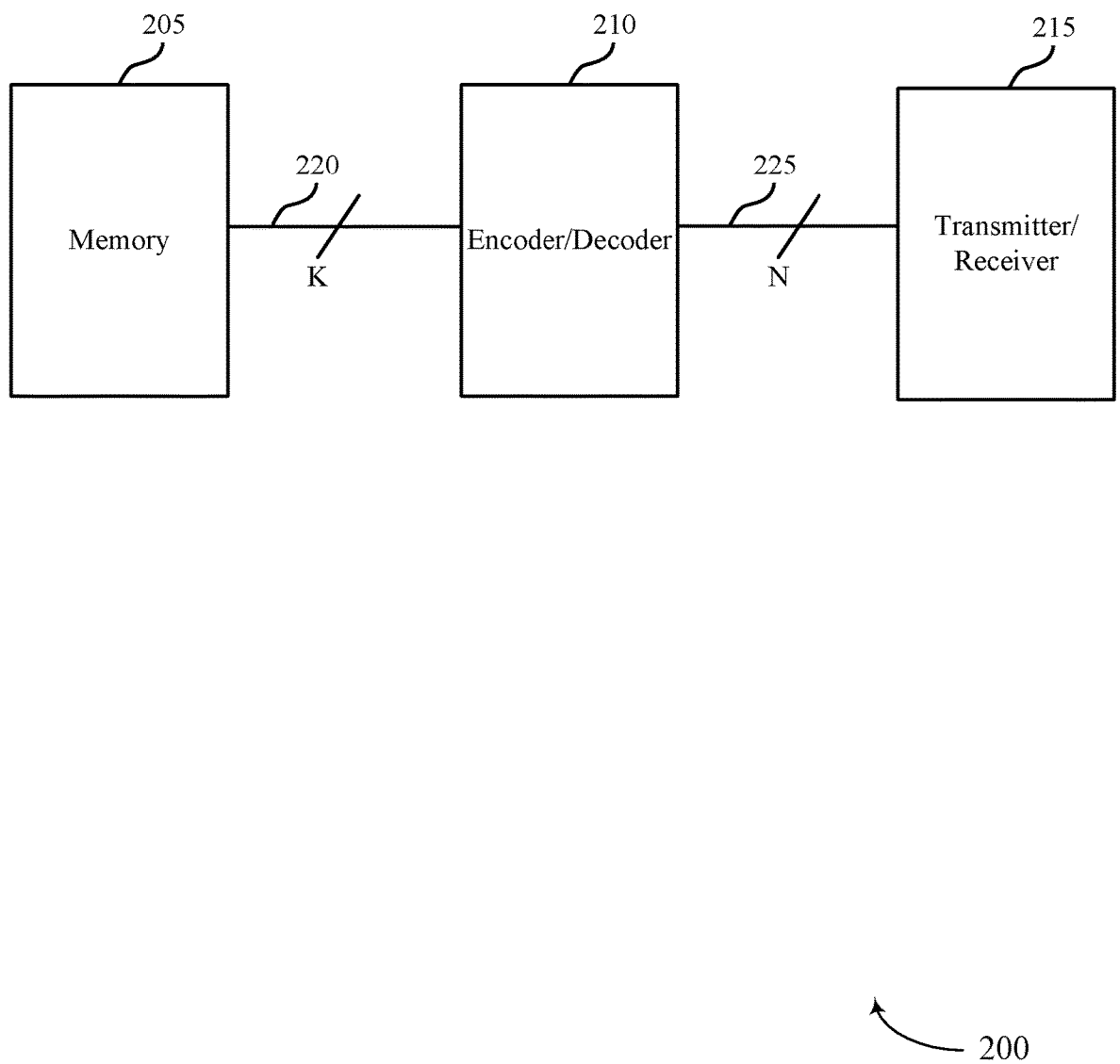
FIG. 2 illustrates an example of a device that supports polar code construction for incremental redundancy in accordance with aspects of the present disclosure.

FIG. 2 illustrates an example of a device 200 that supports polar code construction for incremental redundancy in accordance with aspects of the present disclosure. In some examples, device 200 may implement aspects of wireless communication system 100. The device 200 may be any device within a wireless communications system 100 that performs an encoding or decoding process using an error-correcting code, such as a polar code. Device 200 may be an example of a UE 115 or a base station 105 as described with reference to FIG. 1.

As shown, device 200 includes a memory 205, an encoder/decoder 210, and a transmitter/receiver 215. First bus 220 may connect memory 205 to encoder/decoder 210 and second bus 225 may connect encoder/decoder 210 to transmitter/receiver 215. In some cases, device 200 may have data stored in memory 205 to be transmitted to another device, such as a UE 115 or base station 105. To initiate the transmission process, device 200 may retrieve data for transmission from memory 205. The data may include a number of payload bits, 'A,' which may be 1s or 0s, provided from memory 205 to encoder/decoder 210 via first bus 220. In some cases, these payload bits may be combined with a number of parity or error checking bits, 'E,' to form a total set of information bits, 'A+E.' The number of information bits may be represented as a value 'K,' as shown (e.g., K=A+E). The encoder/decoder 210 may implement a polar code with a block length, 'N,' for encoding the information bits, where N may be different than or the same as K. Such a polar code may be referred to as an (N, K) polar code. In some cases, the bits that are not allocated as information bits (e.g., N−K bits) may be assigned as frozen bits.

In some cases, to perform a polar coding operation, the encoder 210 may generate a mother codeword of length, 'N,' where N is a power of 2 (i.e., $N=2^m$ where m is an integer value). If a resource size M for the codeword is not a power of 2, the encoder 210 may round the value of N up to the nearest valid M value. For example, if M=400, the encoder 210 may determine a codeword length of N=512 (the nearest valid value for N greater than or equal to M) in order to support polar coding. In these cases, the encoder 210 may encode a codeword of length N, and then may puncture a number of bits N−M to obtain a codeword of the specified block length M for transmission.

The encoder 210 may attempt to assign the information bits to the K most reliable bit channels and the frozen bits to the remaining bit channels. The encoder/decoder 210 may employ various techniques for determining the K most (or an estimation of the most) reliable bit channels. For example, the encoder/decoder 210 may implement fractal enhanced kernel (FRANK) polar code construction, polarization-weight (PW), generator weight (GW), density evolution (DE), or a combination of these techniques. In some cases, the encoder/decoder 210 may employ look-up-tables that provide bit-channel reliability based on various combinations of N, M, and K. The encoder 210 may determine information bit channels based on the determined bit-channel reliability, and may assign frozen bits to the remaining bit-channels. Frozen bits may be bits of a default value (e.g., 0, 1, etc.) known to both the encoder and decoder (i.e., the encoder encoding information bits at a transmitter and the decoder decoding the codeword received at a receiver). Further, from the receiving device perspective, device 200 may receive a data signal representing the codeword via receiver 215, and may decode the signal using decoder 210 to obtain the transmitted data.

In some wireless systems, decoder 210 may be an example of a successive cancellation (SC) or a successive cancellation list (SCL) decoder. A UE 115 or base station 105 may receive a transmission including a codeword (e.g., symbol information representing the unpunctured bits of the codeword) at receiver 215, and may send the transmission to the SCL decoder (e.g., decoder 210). The SCL decoder may determine input logarithmic-likelihood ratios (LLRs) for the bit channels of the received codeword. During decoding, the SCL decoder may determine decoded LLRs based on these input LLRs, where the decoded LLRs correspond to each bit channel of the polar code. These decoded LLRs may be referred to as bit metrics. In some cases, if the LLR is zero or a positive value, the SCL decoder may determine the corresponding bit is a 0 bit, and a negative LLR may correspond to a 1 bit. The SCL decoder may use the bit metrics to determine the decoded bit values.

The SCL decoder may employ multiple concurrent SC decoding processes. Each SC decoding process may decode the codeword sequentially (e.g., in order of the bit channel indices). Due to the combination of multiple SC decoding processes, the SCL decoder may calculate multiple decoding path candidates. For example, an SCL decoder of list size 'L' (i.e., the SCL decoder has L SC decoding processes) may calculate L decoding path candidates, and a corresponding reliability metric (e.g., a path metric) for each decoding path candidate. The path metric may represent a reliability of a decoding path candidate or a probability that the corresponding decoding path candidate is the correct set of decoded bits. The path metric may be based on the determined bit metrics and the bit values selected at each bit channel. The SCL decoder may have a number of levels equal to the number of bit channels in the received codeword. At each level, each decoding path candidate may select either a 0 bit or a 1 bit based on a path metric of the 0 bit and the 1 bit. The SCL decoder may select a decoding path candidate based on the path metrics, and may output the bits corresponding to the selected decoding path as the decoded sets of bits. For example, the SCL decoder may select the decoding paths with the highest path metrics for error checking, and may determine a successfully decoded path candidate based on a result of the error checking process.

If an SCL decoder determines that the first number of bits are all frozen bits, the SCL decoder may determine that the correct decoding path for the first number of bits must be the default frozen bit values (e.g., if the default frozen bit value is 0, the correct decoding path for the first number of bits must be all 0's). Once the SCL decoder reaches the first information bit, the SCL decoder may begin performing operations to decode the rest of the bits of the codeword, as the SCL decoder may not be able to determine the correct decoding path from the first information bit onwards (because the first information bit may be a 0 or a 1). However, the SCL decoder may still determine bit metrics for the bit channels containing frozen bits, and may use these bit metrics when calculating path metrics for the decoding path candidates. For example, the SCL decoder may update the path metric for the decoding candidates after every bit, regardless of bit type (e.g., after each frozen bit, payload bit, parity bit, etc.).

Transmitting devices and receiving devices, such as base stations 105 and UEs 115, may use polar coding to increase the reliability of a communications link. The transmitting devices and receiving devices may also use IR-HARQ operations to increase the reliability of a communications link. IR-HARQ operation may include retransmitting (at least partially) redundant codewords, allowing a receiving device to perform successive decoding operations. Each decoding operation may provide the receiving device with additional information for decoding and increase the likelihood of a successful decoding of the encoded information.

In some examples, transmitting devices and receiving devices may use polar coding in combination with IR-HARQ operation to further increase the reliability of a communications link. As discussed above, polar codes approach the theoretical channel capacity as the code length increases, and each retransmission for a HARQ operation may effectively increase the code length of a data transmission. As described above, each sub-channel, or polarized bit-channel, of a polar code may be associated with a reliability, and the reliability of some sub-channels may be higher than others. In the context of IR-HARQ operation, a first set of sub-channels may be a set of highest reliability channels for a polar code of size N while a second set of sub-channels may be a set of highest reliability channels for a polar code of size 2N. In accordance with aspects of the present disclosure, an adjusted information bit index set may be selected for polar encoding associated with an IR-HARQ operation. The adjusted information bit index set may be determined in accordance with aspects of the present disclosure and may in some cases represent a compromise between bit indices associated with different size polar codes.

Figure 3:
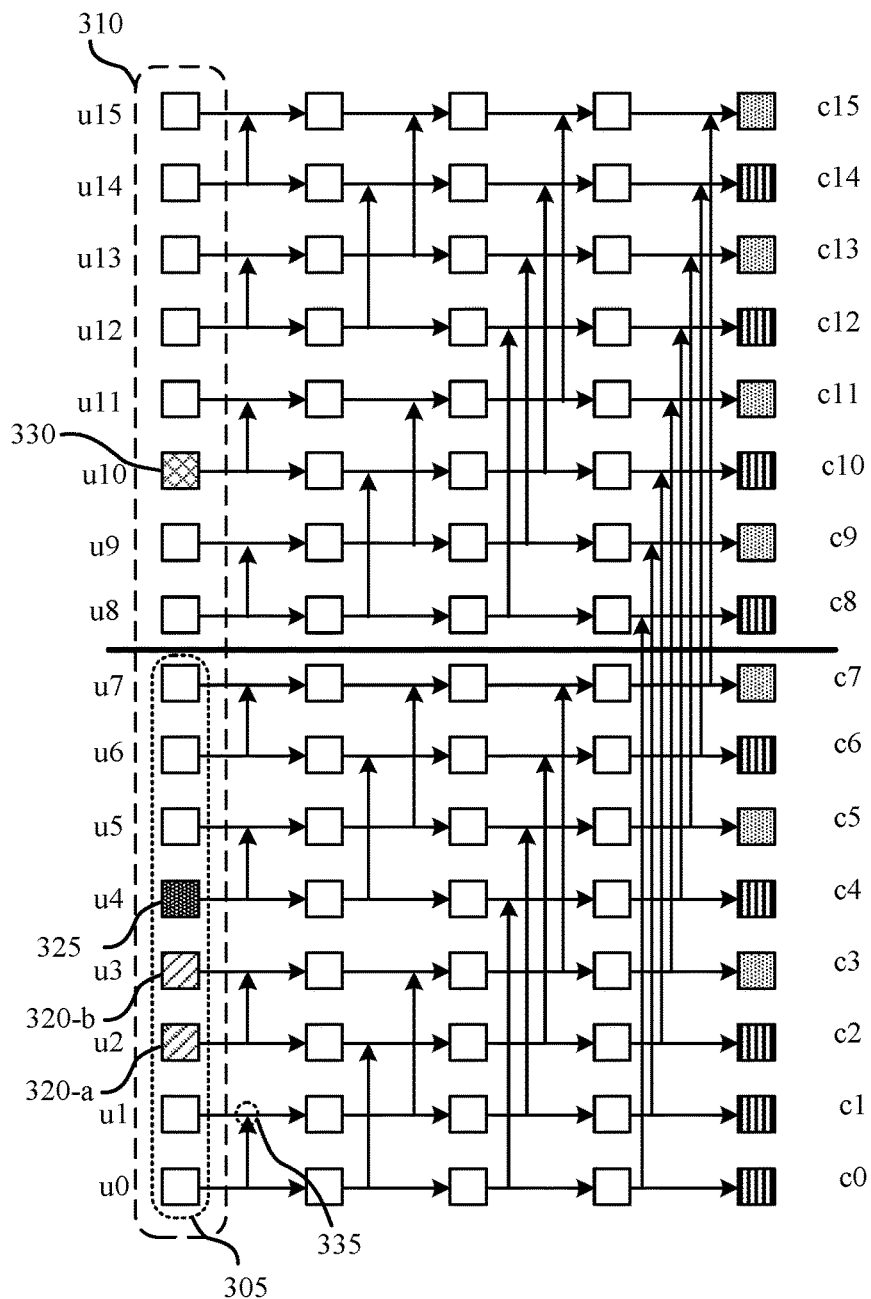
FIG. 3 illustrates an example of an encoding operation that supports polar code construction for incremental redundancy in accordance with aspects of the present disclosure.

FIG. 3 illustrates an example of an encoding scheme 300 that supports polar code construction for incremental redundancy in accordance with aspects of the present disclosure. Encoding scheme 300 may illustrate aspects of a transmission between a UE 115 and a base station 105, as described above with reference to FIGS. 1 and 2. Encoding scheme 300 may include first polarized bit channels 305 and second polarized bit channels 310. For example, first polarized bit channels 305 may correspond to a first polar coding operation with N=8 while second polarized bit channels 310 may correspond to a second polar coding operation with N=16. Each polar coding operation may involve XOR operations 335 used for generating encoded bits 345 (e.g., and punctured bits 340).

With reference to first polarized bit channels 305, an information bit vector (e.g., having a length of K=3) may be encoded by loading information bits into common bit index 320-$a$, common bit index 320-$b$, and first difference bit index 325 (with the remaining bit positions corresponding to frozen bits 315). For example, these three bit channels (e.g., 2, 3, and 4) may have a highest reliability among first polarized bit channels 305 for the first polar coding operation. However, for second polarized bit channels 310, the same information bit vector (e.g., having a length of K=3) may be encoded by loading information bits onto common bit index 320-$a$, common bit index 320-$b$, and second difference bit index 330. That is, bit channel 10 may be associated with a higher reliability than bit channel 4 for the second polarized bit channels 310 for the second polar coding operation. In accordance with aspects of the present disclosure, an adjusted bit index set for IR-HARQ operations may be selected to provide a compromise between the different information bit index sets for different size codewords.

In some examples, a transmitting device may encode the three information bits to obtain a mother codeword (encoded bits 345 and punctured bits 340) using a polar code of size N (e.g., N=16). The device may prepare a first transmission by applying a first puncturing pattern to the mother codeword and may prepare a retransmission by applying a second puncturing pattern to the mother codeword. As shown, the transmitting device may use a block length of M=9 so the transmitting device may round up to generate the mother codeword of size N=16, and puncture seven bits of the mother codeword (corresponding to punctured bits 340) to generate a transmission of the block length M.

In some examples, information bit allocation may be determined based on PW, GW, DE, and/or FRANK channel reliability estimation. In some cases, information bits are mapped to the most reliable bit channels of the first polarized bit channels 305 (e.g., bit channels 2, 3, and 4, respectively). The K bit channels selected for information bits of the first polarized bit channels 305 may be referred to as a first reference set of bit channels, A. In some cases, A={$i_0$, $i_1$, ..., $i_{K-1}$}, 0≤$i_j$<N is the index set of the information bits in the U-domain, where the corresponding payloads may be denoted as {$u_0$, $u_1$, ..., $u_{K-1}$}. The transmitting device may generate the mother codeword of size N=16, and puncture seven bits to generate a first codeword of length M=9. The transmitting device may then transmit the nine bits of the first codeword (e.g., corresponding to M, the block length) to a receiving device.

The receiving device may not successfully decode the first codeword. In some cases, the receiving device may indicate the failure, for example, in a negative acknowledgment, to the transmitting device. In some other examples, the transmitting device may not receive feedback for the first codeword, as it was not successfully received by the receiving device (e.g., due to interference, etc.). The transmitting device may transmit a second subset of the mother codeword (e.g., a different combination of punctured bits 340 and encoded bits 345 than illustrated) to the receiving device in a retransmission. The receiving device may receive the second codeword and may combine the first and second codewords (e.g., may soft-combine LLRs) to generate a larger decoding candidate. The receiving device may have a higher likelihood of decoding the larger decoding candidate since each received bit in a polar coded transmission may provide additional information for decoding another bit.

In some examples, each transmitted codeword may be self-decodable (may not depend on successful reception of any other codewords). Alternatively, in some cases the transmitted codewords may be at least somewhat interdependent (such that each retransmission may not be decodable by itself). In some cases, each transmitted codeword may include at least one encoded bit 345 higher than an information bit index used to generate the mother codeword. For example, if second difference bit index 330 is used to generate the mother codeword, at least one of c10, c11, c12, c13, c14, or c15 may be included in encoded bits 345. Alternatively, in the case that a SCL decoder is used, one or more information bit indices (depending on the size L of the SCL decoder) may be above a highest indexed encoded bit 345 (because the SCL decoder may support random decoding of such information bit indices) without making the codeword non-decodable.

Figure 4:
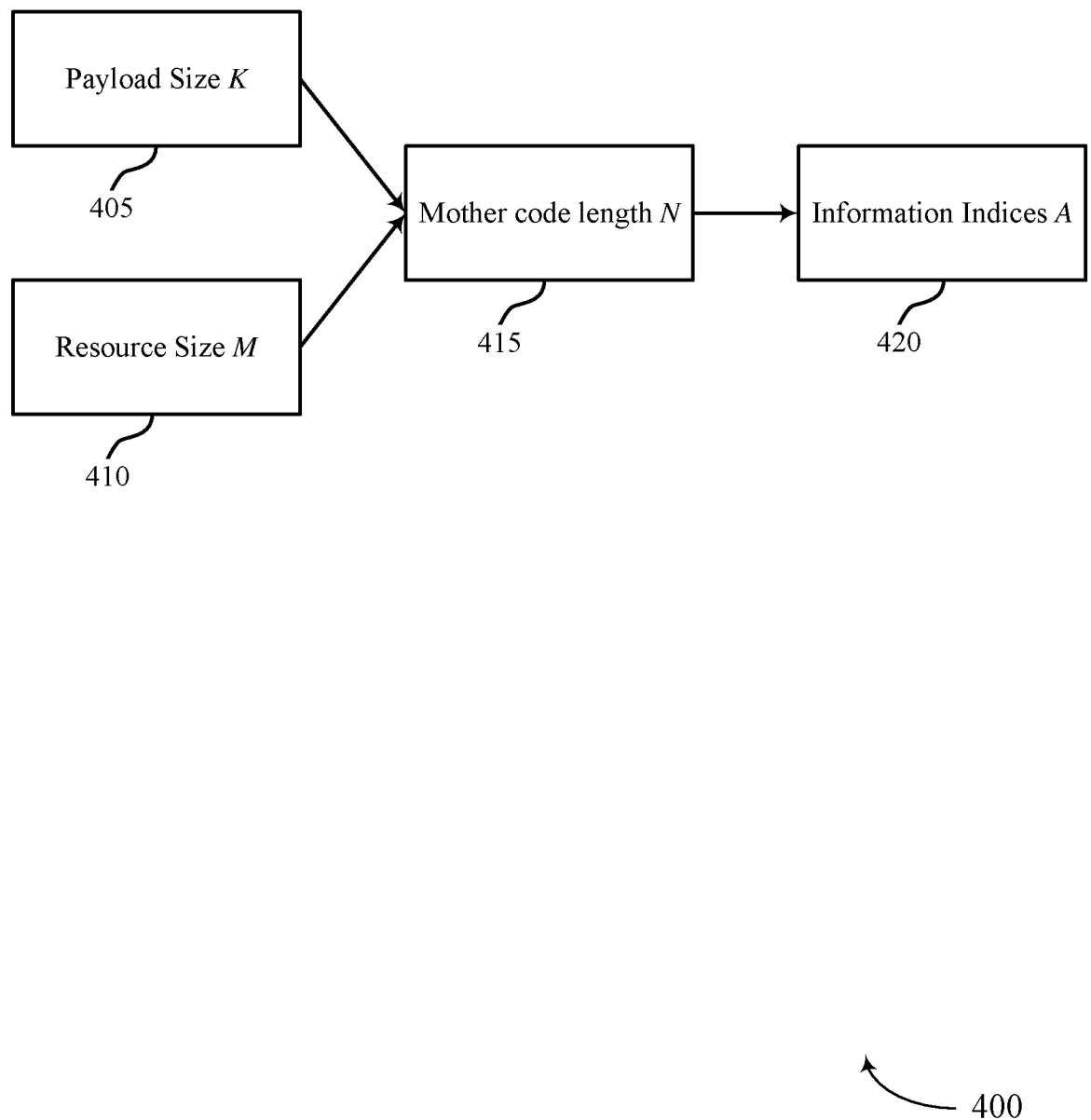
FIG. 4 illustrates an example of a process flow that supports polar code construction for incremental redundancy in accordance with aspects of the present disclosure.

FIG. 4 illustrates an example of a process flow 400 that supports polar code construction for incremental redundancy in accordance with aspects of the present disclosure. In some examples, process flow 400 may implement aspects of wireless communication system 100. For example, process flow 400 may be implemented at a transmitter (e.g., an encoder) or a receiver (e.g., a decoder) as described herein.

At 405, a device may identify a payload size K, which may correspond to the size of an information bit vector. For example, with reference to FIG. 3, K may be three. It is to be understood that the numbers included in this and other examples are included for simplicity of explanation and are not necessarily limiting of scope. For example, K may be any suitable number (e.g., 12, 128, 151).

At 410, the device may identify a resource size M associated with an IR-HARQ transmission scheme. For example, the resource size may include or represent an aggregation of the resource sizes associated with the IR-HARQ transmissions. By way of example, if the IR-HARQ scheme is configured to use $M_1$=7, $M_2$=10, and $M_3$=8 for a first, second, and third transmission, respectively, resource size M may be 25.

At 415, the device may identify a mother code length N based on the resource size M. For example, when M is 25, the device may identify a mother code length of N=32 (e.g., a next power of 2 that is greater than M). At 420, the device may determine a set of information indices A for the polar IR-HARQ scheme. In some cases, the set of information indices may be selected based at least in part on two or more reference bit index sets, for example, as described with reference to FIG. 5.

Figure 5:
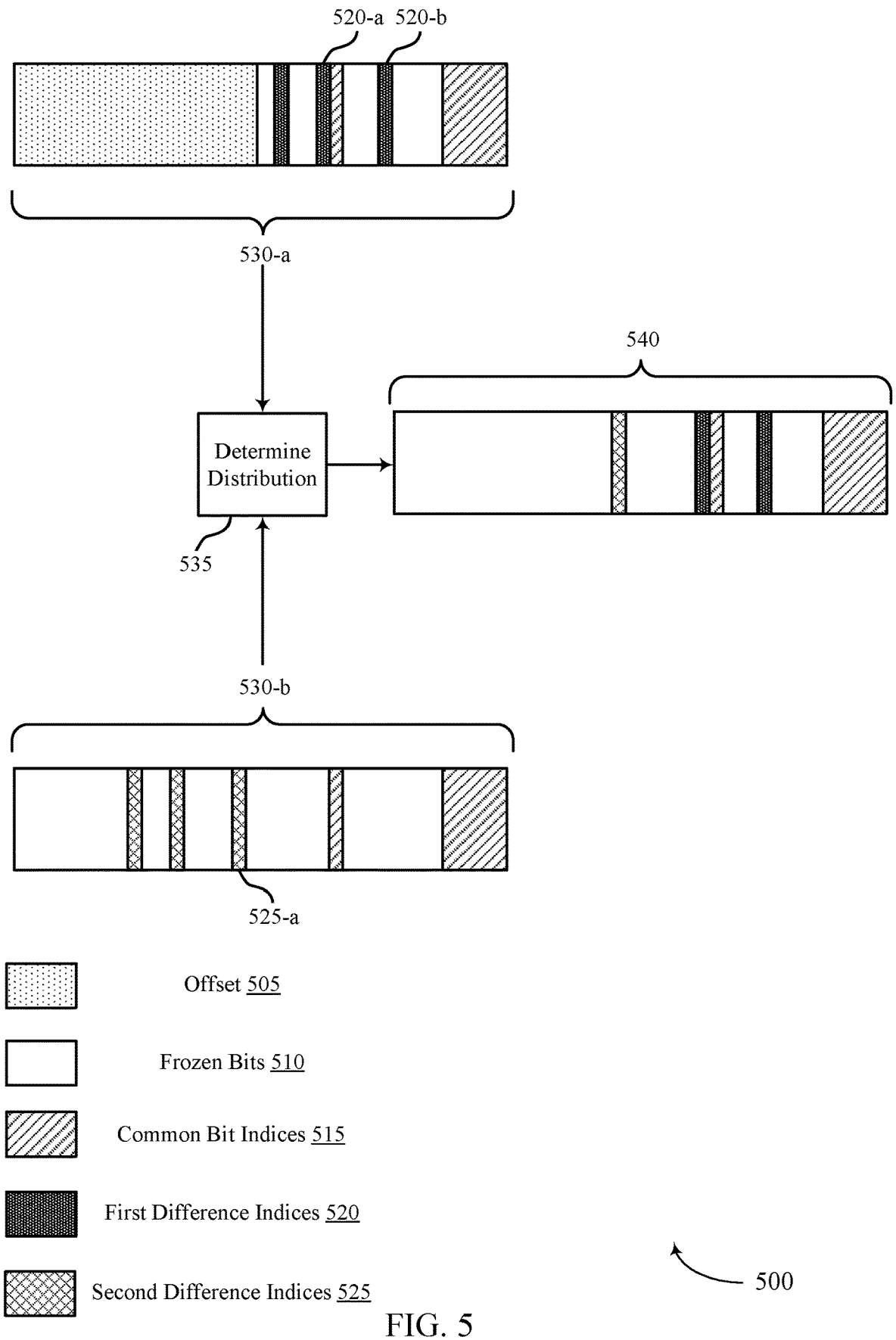
FIG. 5 illustrates an example of an index operation that supports polar code construction for incremental redundancy in accordance with aspects of the present disclosure.

FIG. 5 illustrates an example of an index operation 500 that supports polar code construction for incremental redundancy in accordance with aspects of the present disclosure. In some examples, index operation 500 may implement aspects of wireless communication system 100. For example, index operation 500 may be implemented at a transmitter (e.g., an encoder) or a receiver (e.g., a decoder) as described herein.

Index operation includes first reference index set 530-a and second reference index set 530-b. Though two reference index sets 530 are illustrated, it is to be understood that any number of reference index sets 530 may be included without deviating from the scope of the present disclosure. First reference index set 530-a may include information bit indices for a polar code having a first length (e.g., N) while second reference index set 530-b may include information bit indices for a polar code having a second length (e.g., 2N, 3N). Aspects of the present disclosure relate to identifying an adjusted bit index set 540 based at least in part on the reference index sets 530. In some cases, adjusted bit index set 540 may include common bit indices 515 and a distribution of first difference bit indices 520 and second difference bit indices 525.

Common bit indices 515 may represent bit channels that correspond to a most reliable set of bit positions for both the polar code having the first length and the polar code having the second length. In some cases, an offset 505 may be added to the indices of the polar code having the first length to allow a direct comparison between indices (e.g., to normalize the indices). First difference bit indices 520 may include a remaining most reliable set of bit positions for first reference index set 530-a (but not for second reference index set 530-b) while second difference bit indices 525 may include a remaining most reliable set of bit positions for second reference index set 530-b (but not for first reference index set 530-a). That is, first difference bit indices 520 and second difference bit indices 525 may not be common to both (e.g., or all, a majority of, etc.) reference index sets 530.

As illustrated, at 535 a device may determine a distribution of the difference bit indices to generate adjusted bit index set 540. For example, the device may identify (based on some look-up table) first difference bit indices 520-a and 520-b and second difference bit index 525-a for inclusion in adjusted bit index set 540. The number of bit indices selected from each reference index set 530 may vary (e.g., based on a type of communication, channel quality, etc.). For example, latency-intolerant communications may prioritize bit indices from reference index set 530-a.

Generally, a device may identify an information block size K, and resource sizes for a plurality of transmissions $(M_1=7, M_2=10, \ldots, M_T)$. The device (or some network entity) may determine a mother code length after each transmission (e.g., based on combination of codewords) according to $N_t = 2^{\lceil log_2(M_1+M_2+\ldots+M_t) \rceil}$ where $t=1, 2, \ldots, T$. The device may then determine a reference information index set $A_t$ for each transmission based on K and the corresponding $N_t$. The device may then normalize the elements of each $A_t$ (e.g., by adding an appropriate offset 505) according to $B_t = \{i+N_T-N_t | i \in A_t\}$. The device may then identify a common bit indices C as $C = B_1 \cap B_2 \cap \ldots \cap B_T$ and difference index sets (e.g., all of size $K_C$) as $D_t = B_t - C$. The device may then select the more reliable (e.g., or otherwise preferable) parts of $D_t$ as $E_t$ with size $|E_t| = \alpha_t K_c$, where $\Sigma_t \alpha_t = 1$ and may output a largest mother code length $N_T$ according to adjusted bit index set $A = C \cup E_1 \cup \ldots \cup E_T$.

Figure 6:
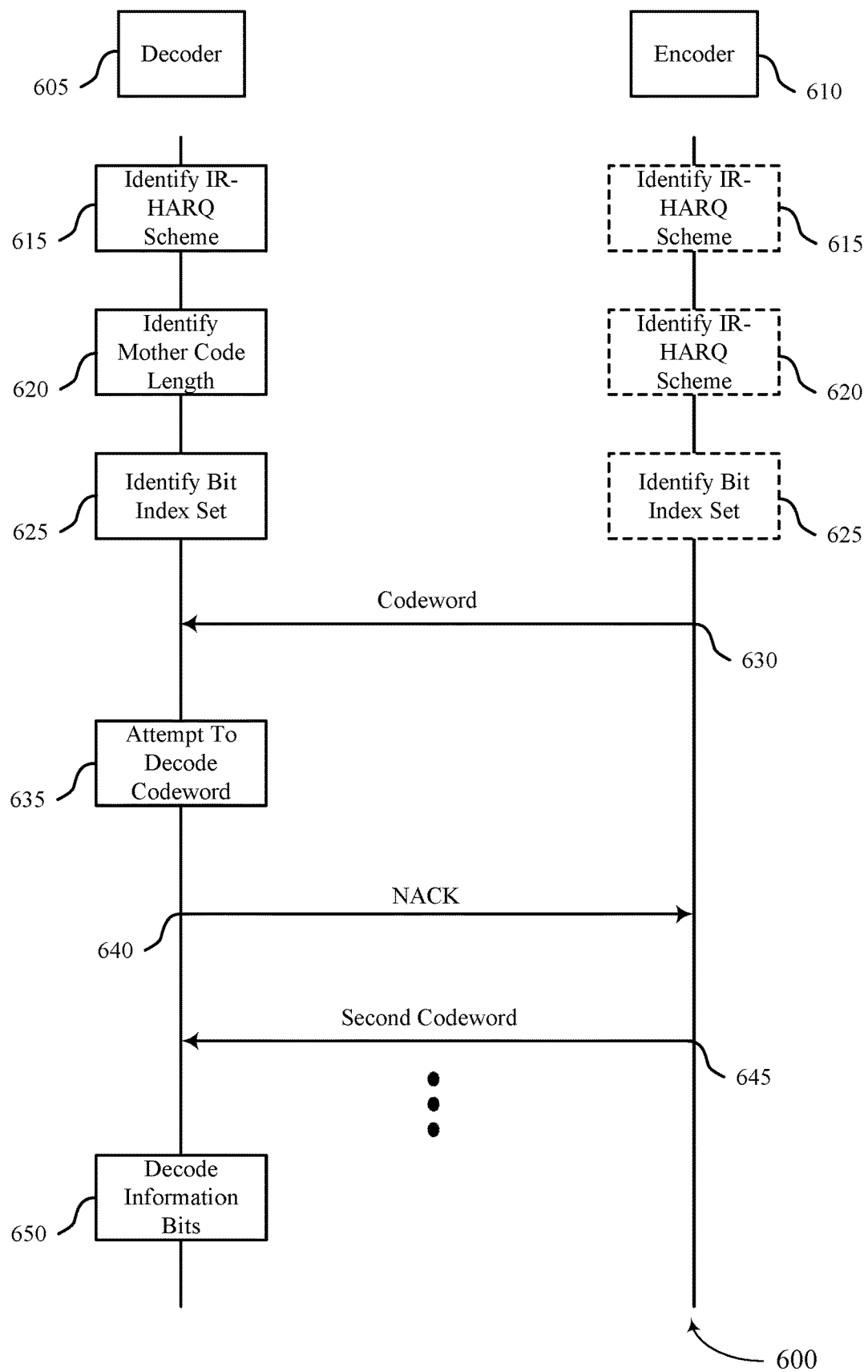
FIG. 6 illustrates an example of a process flow that supports polar code construction for incremental redundancy in accordance with aspects of the present disclosure.

FIG. 6 illustrates an example of a process flow 600 that supports polar code construction for incremental redundancy in accordance with aspects of the present disclosure. In some examples, process flow 600 may implement aspects of wireless communication system 100. Process flow 600 includes decoder 605 and encoder 610 (e.g., each of which may be an example of a device 200 as described with reference to FIG. 2, a UE 115 or base station 105 described with reference to FIG. 1, or the like).

At 615, decoder 605 (and/or encoder 610) may identify that an IR-HARQ scheme is used in association with sequential transmissions of an information bit vector from encoder 610, where each transmission in the IR-HARQ scheme is associated with a resource size. For example, decoder 605 may identify a number of HARQ processes supported by the IR-HARQ scheme, where the aggregate resource size associated with the sequential transmissions is based at least in part on the number of HARQ processes.

At 620, decoder 605 (and/or encoder 610) may identify a mother code length for a polar code used in association with the IR-HARQ scheme based at least in part on an aggregate resource size associated with the sequential transmissions. In some cases, the resource size associated with a first transmission is different from the resource size associated with a second transmission.

At 625, decoder 605 (and/or encoder 610) may identify a bit index set for the polar code based at least in part on the IR-HARQ scheme. For example, the bit index set may be an example of an adjusted bit index set 540 as described with reference to FIG. 4. In some cases, the device may select the bit index set from a plurality of candidate bit index sets (e.g., from a plurality of tables of bit indices) based at least in part on a vector length of the information bit vector, the mother code length, or a combination thereof. In some cases, the device may identify a communication type associated with the information bit vector, wherein the bit index set is based at least in part on the communication type.

At 630, decoder 605 may receive a first subset of the encoded bits from encoder 610. For example, the first subset of the encoded bits may be generated according to some puncturing pattern applied to a mother codeword. Decoder 605 may attempt to decode the first subset of the encoded bits at 635, but upon failing to decode may transmit a negative acknowledgement at 640 (or may otherwise indicate the failed decoding operation to encoder 610).

At 645, decoder 605 may receive a second subset of the encoded bits from encoder 610. For example, the second subset of the encoded bits may be generated according to a second puncturing pattern applied to the mother codeword. After some number of retransmissions, decoder 605 may successfully decode the information bits at 650.

Figure 7:
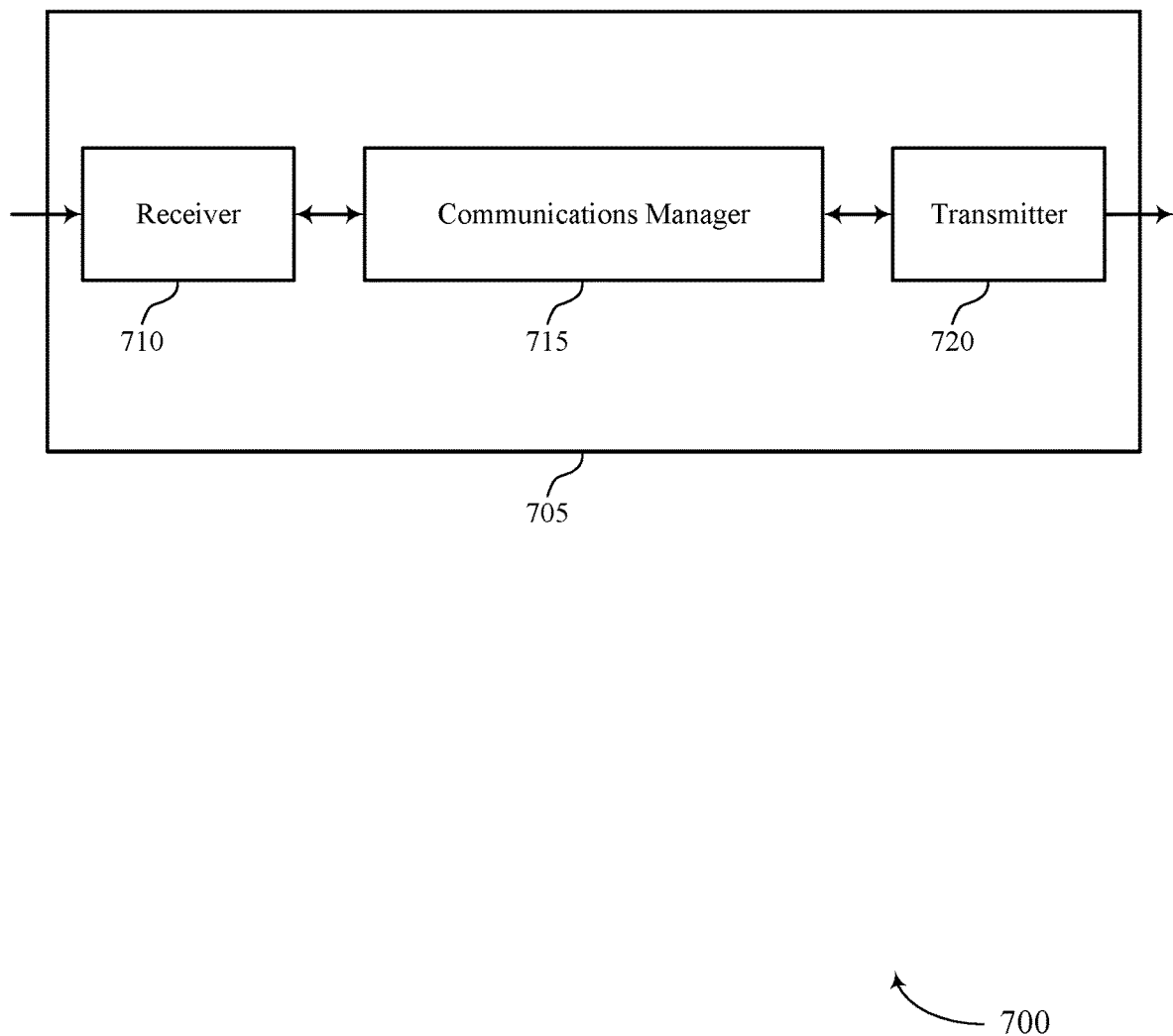
FIGS. 7 and 8 show block diagrams of devices that support polar code construction for incremental redundancy in accordance with aspects of the present disclosure.

FIG. 7 shows a block diagram 700 of a device 705 that supports polar code construction for incremental redundancy in accordance with aspects of the present disclosure. The device 705 may be an example of aspects of a device 200 as described with reference to FIG. 2, a decoder 605, or an encoder 610 as described with reference to FIG. 6. In some cases, device 705 may act as a decoder or an encoder (e.g., but not both). Alternatively, device 705 may support both encoding and decoding operations, and some of these operations may share circuitry or otherwise overlap. While aspects of the following are described in the context of a device 705 performing both decoding and encoding operations, it is to be understood that in some examples a device 705 may only support decoding or encoding operations described herein (e.g., but not both). The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to polar code construction for incremental redundancy, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify that an IR-HARQ scheme is used in association with sequential transmissions of an information bit vector from a wireless device, where each transmission in the IR-HARQ scheme is associated with a resource size. The communications manager 715 may identify a mother code length for a polar code used in association with the IR-HARQ scheme based on an aggregate resource size associated with the sequential transmissions. The communications manager 715 may identify a bit index set for the polar code based on the IR-HARQ scheme. The communications manager 715 (e.g., when supporting decoding operations) may receive, for each transmission of the information bit vector, a respective subset of encoded bits generated by mapping the information bit vector to a set of polarized bit channels of the polar code in accordance with the bit index set. Additionally or alternatively, the communications manager 715 (e.g., when supporting encoding operations) may transmit, for each transmission of the information bit vector, a respective subset of encoded bits generated by mapping the information bit vector to a set of polarized bit channels of the polar code in accordance with the bit index set. The communications manager 715 may be an example of aspects of the communications manager 1010 described herein.

The actions performed by communications manager 715 as described herein may be implemented to realize one or more potential advantages. One implementation may allow a receiving device to receive retransmissions with additional information for decoding candidates which may increase the likelihood of successfully decoding an information bit vector. Another implementation may provide a flexible code construction for polar IR-HARQ operations and may in some cases provide a better tradeoff between performance of an initial transmission and the following retransmissions.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
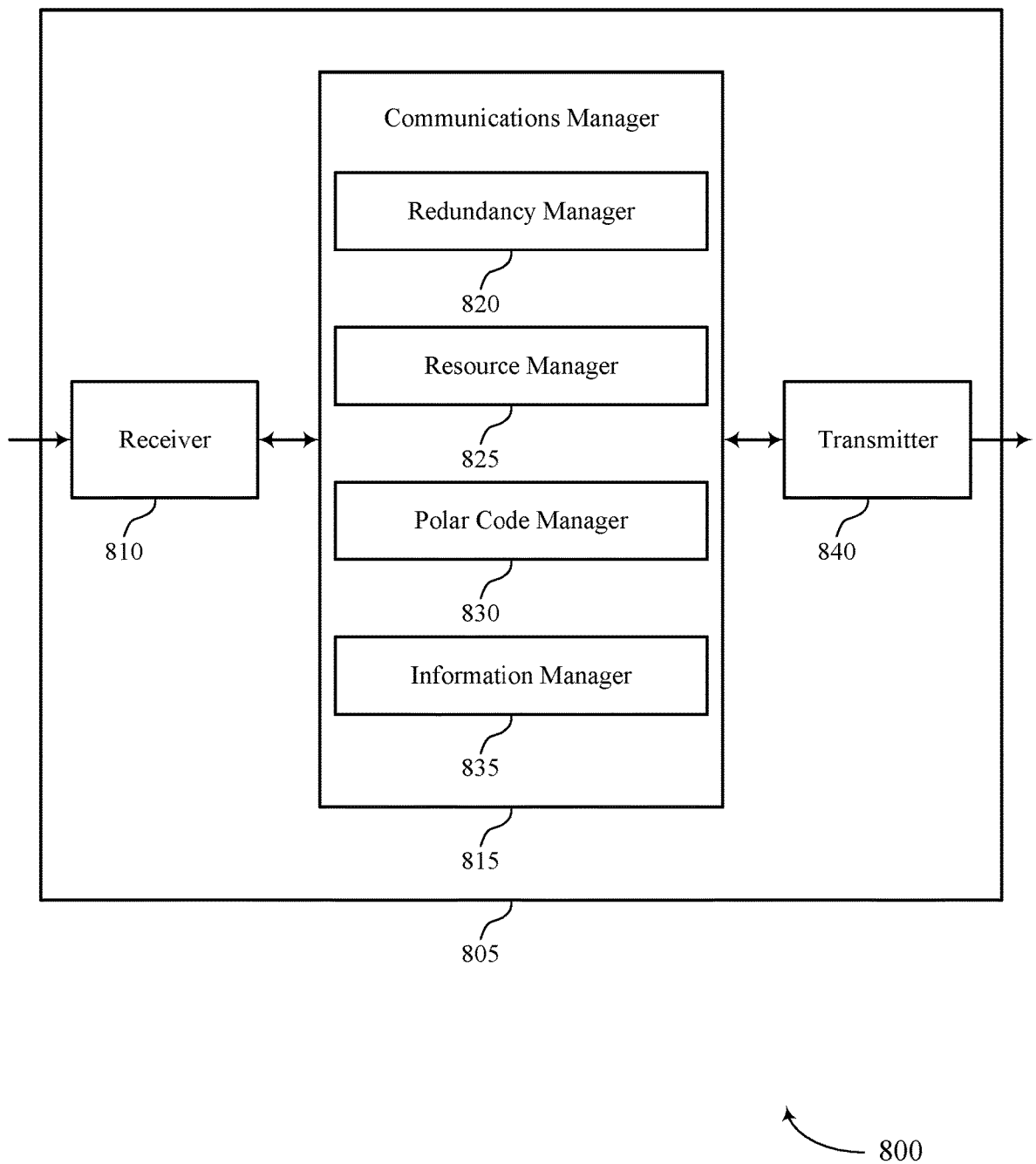

FIG. 8 shows a block diagram 800 of a device 805 that supports polar code construction for incremental redundancy in accordance with aspects of the present disclosure. The device 805 may be an example of aspects of a device 200 as described with reference to FIG. 2 or a device 705. While aspects of the following are described in the context of a device 805 performing both decoding and encoding operations, it is to be understood that in some examples a device 805 may only support decoding or encoding operations described herein (e.g., but not both). The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to polar code construction for incremental redundancy, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a redundancy manager 820, a resource manager 825, a polar code manager 830, and an information manager 835. The communications manager 815 may be an example of aspects of the communications manager 1010 described herein.

The redundancy manager 820 may identify that an IR-HARQ scheme is used in association with sequential transmissions of an information bit vector from a wireless device, where each transmission in the IR-HARQ scheme is associated with a resource size. The resource manager 825 may identify a mother code length for a polar code used in association with the IR-HARQ scheme based on an aggregate resource size associated with the sequential transmissions. The polar code manager 830 may identify a bit index set for the polar code based on the IR-HARQ scheme. The information manager 835 may receive, for each transmission of the information bit vector, a respective subset of encoded bits generated by mapping the information bit vector to a set of polarized bit channels of the polar code in accordance with the bit index set. Additionally or alternatively, the information manager 835 may transmit, for each transmission of the information bit vector, a respective subset of encoded bits generated by mapping the information bit vector to a set of polarized bit channels of the polar code in accordance with the bit index set.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
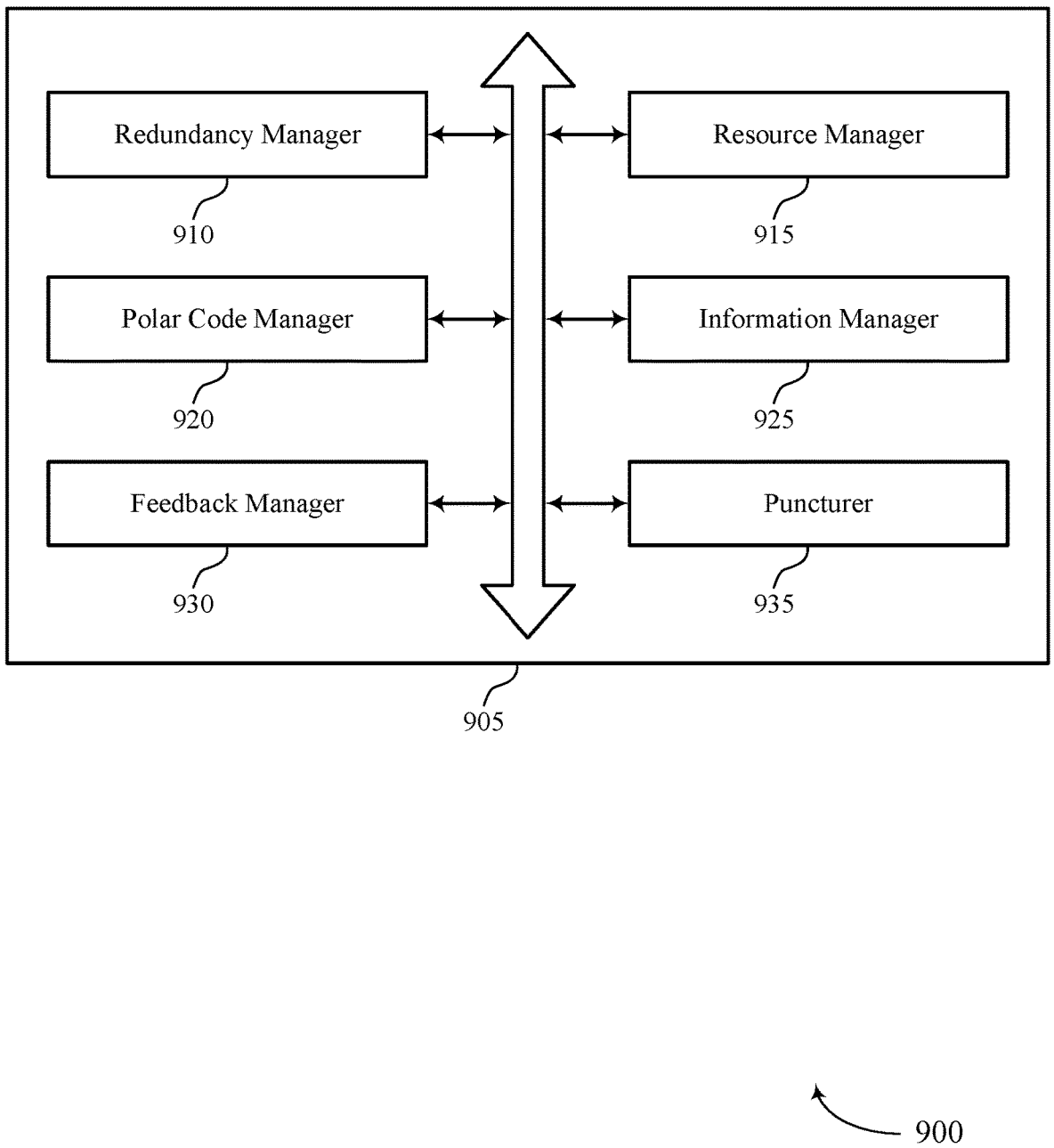
FIG. 9 shows a block diagram of a communications manager that supports polar code construction for incremental redundancy in accordance with aspects of the present disclosure.

FIG. 9 shows a block diagram 900 of a communications manager 905 that supports polar code construction for incremental redundancy in accordance with aspects of the present disclosure. The communications manager 905 may be an example of aspects of a communications manager 715, a communications manager 815, or a communications manager 1010 described herein. While aspects of the following are described in the context of a communications manager 905 performing both decoding and encoding operations, it is to be understood that in some examples a communications manager 905 may only support decoding or encoding operations described herein (e.g., but not both). The communications manager 905 may include a redundancy manager 910, a resource manager 915, a polar code manager 920, an information manager 925, a feedback manager 930, and a puncturer 935. Each of these modules may communicate, directly or indirectly, with one another (e.g., via one or more buses).

The redundancy manager 910 may identify that an IR-HARQ scheme is used in association with sequential transmissions of an information bit vector from a wireless device, where each transmission in the IR-HARQ scheme is associated with a resource size. In some examples, the redundancy manager 910 may identify a number of HARQ processes supported by the IR-HARQ scheme, where the aggregate resource size associated with the sequential transmissions is based on the number of HARQ processes.

The resource manager 915 may identify a mother code length for a polar code used in association with the IR-HARQ scheme based on an aggregate resource size associated with the sequential transmissions. In some cases, the resource size associated with a first transmission is different from the resource size associated with a second transmission.

The polar code manager 920 may identify a bit index set for the polar code based on the IR-HARQ scheme. In some examples, the polar code manager 920 may select the bit index set from a set of candidate bit index sets based on a vector length of the information bit vector, the mother code length, or a combination thereof. In some examples, the polar code manager 920 may identify a resource size associated with a first transmission and a number of bits in the information bit vector. In some examples, the polar code manager 920 may identify a first reference bit index set corresponding to a first polar code length based on the resource size and the number of bits in the information bit vector. In some examples, the polar code manager 920 may identify a communication type associated with the information bit vector, where the bit index set is based on the communication type.

In some cases, the bit index set is based on a set of reference bit index sets, each reference bit index corresponding to a respective mother code length that is based on the resource size of one or more of the transmissions. In some cases, the bit index set includes a common set of bit indices that is common to each of the set of reference bit index sets and a distribution of bit indices from difference sets, each difference set specific to a respective reference bit index set of the set of reference bit index sets. In some cases, the common set of bit indices is identified based on normalizing each of the set of reference bit index sets to have a same set size. In some cases, the distribution of bit indices from the difference sets is based on a priority ranking of the sequential transmissions. In some cases, a first reference bit index set corresponds to a first mother code length that is based on the resource size associated with a first transmission and a second reference bit index set corresponds to a second mother code length that is based on an aggregation of the resource size associated with the first transmission and the resource size associated with a second transmission.

In some examples, (e.g., when communications manager 1005 supports decoding operations described herein), the information manager 925 may receive, for each transmission of the information bit vector, a respective subset of encoded bits generated by mapping the information bit vector to a set of polarized bit channels of the polar code in accordance with the bit index set. In some examples, the information manager 925 may receive a first subset of the encoded bits from the wireless device. In some examples, the information manager 925 may receive a second subset of the encoded bits from the wireless device. In some examples, the information manager 925 may decode the information bit vector based on the first and second subsets. In some examples, the information manager 925 may generate a set of candidate bit vectors, each candidate bit vector based on one or more subsets. In some examples, the information manager 925 may attempt to decode the information bit vector in accordance with the bit index set by applying the polar code to each candidate bit vector.

In some examples (e.g., when communications manager 1005 supports encoding operations described herein), the information manager 925 may transmit, for each transmission of the information bit vector, a respective subset of encoded bits generated by mapping the information bit vector to a set of polarized bit channels of the polar code in accordance with the bit index set. In some examples, the information manager 925 may transmit a first subset of the encoded bits to the wireless device. In some examples, the information manager 925 may transmit a second subset of the encoded bits to the wireless device. In some cases, a first subset of the encoded bits has a same bit length as a second subset of the encoded bits.

The feedback manager 930 may transmit, to the wireless device, an indication that a decoding of the first subset of encoded bits was unsuccessful. In some examples, the feedback manager 930 may receive, from the wireless device, an indication that a decoding of the first subset of encoded bits was unsuccessful. The puncturer 935 may generate each subset of encoded bits by applying a respective puncturing pattern to the encoded bits.

Figure 10:
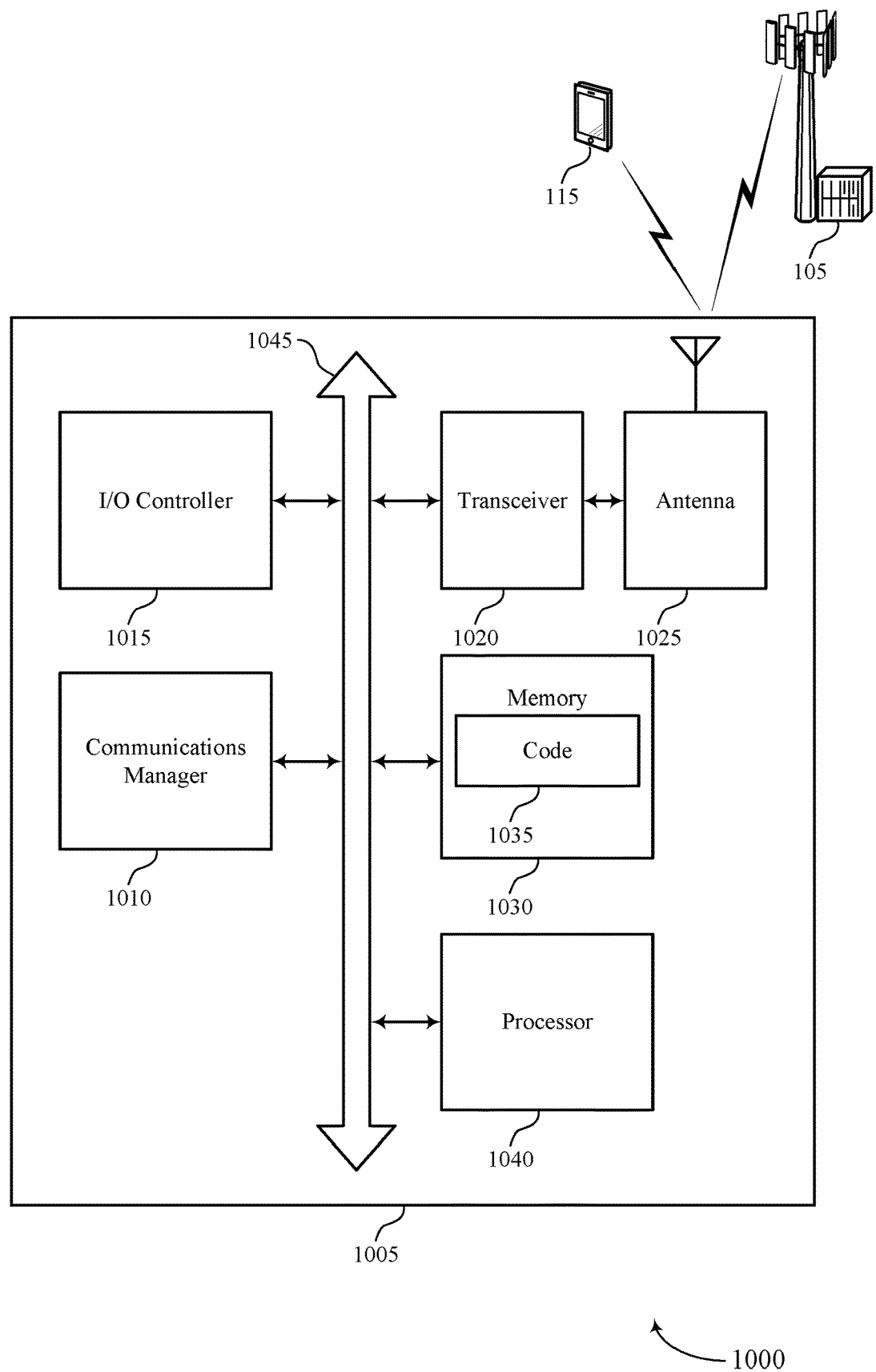
FIG. 10 shows a diagram of a system including a device that supports polar code construction for incremental redundancy in accordance with aspects of the present disclosure.

FIG. 10 shows a diagram of a system 1000 including a device 1005 that supports polar code construction for incremental redundancy in accordance with aspects of the present disclosure. The device 1005 may be an example of or include the components of device 705, device 805, a UE 115, a base station 105, or the like as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify that an IR-HARQ scheme is used in association with sequential transmissions of an information bit vector from a wireless device, where each transmission in the IR-HARQ scheme is associated with a resource size. The communications manager 1010 may identify a mother code length for a polar code used in association with the IR-HARQ scheme based on an aggregate resource size associated with the sequential transmissions. The communications manager 1010 may identify a bit index set for the polar code based on the IR-HARQ scheme. The communications manager 1010 may receive, for each transmission of the information bit vector, a respective subset of encoded bits generated by mapping the information bit vector to a set of polarized bit channels of the polar code in accordance with the bit index set. The communications manager 1010 may additionally or alternatively transmit, for each transmission of the information bit vector, a respective subset of encoded bits generated by mapping the information bit vector to a set of polarized bit channels of the polar code in accordance with the bit index set.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting polar code construction for incremental redundancy).

Based on selecting an adjusted information bit index set that supports IR-HARQ operations and transmitting one or more codewords encoded using a polar code according to the adjusted information bit index set, processor 1040 of a receiving device may have an increased likelihood that the information bits are successfully received. As such, procedures at processor 1040 may run more efficiently through the reduction of erroneous data signals and through the reduction of repeated data transmissions due to interference.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
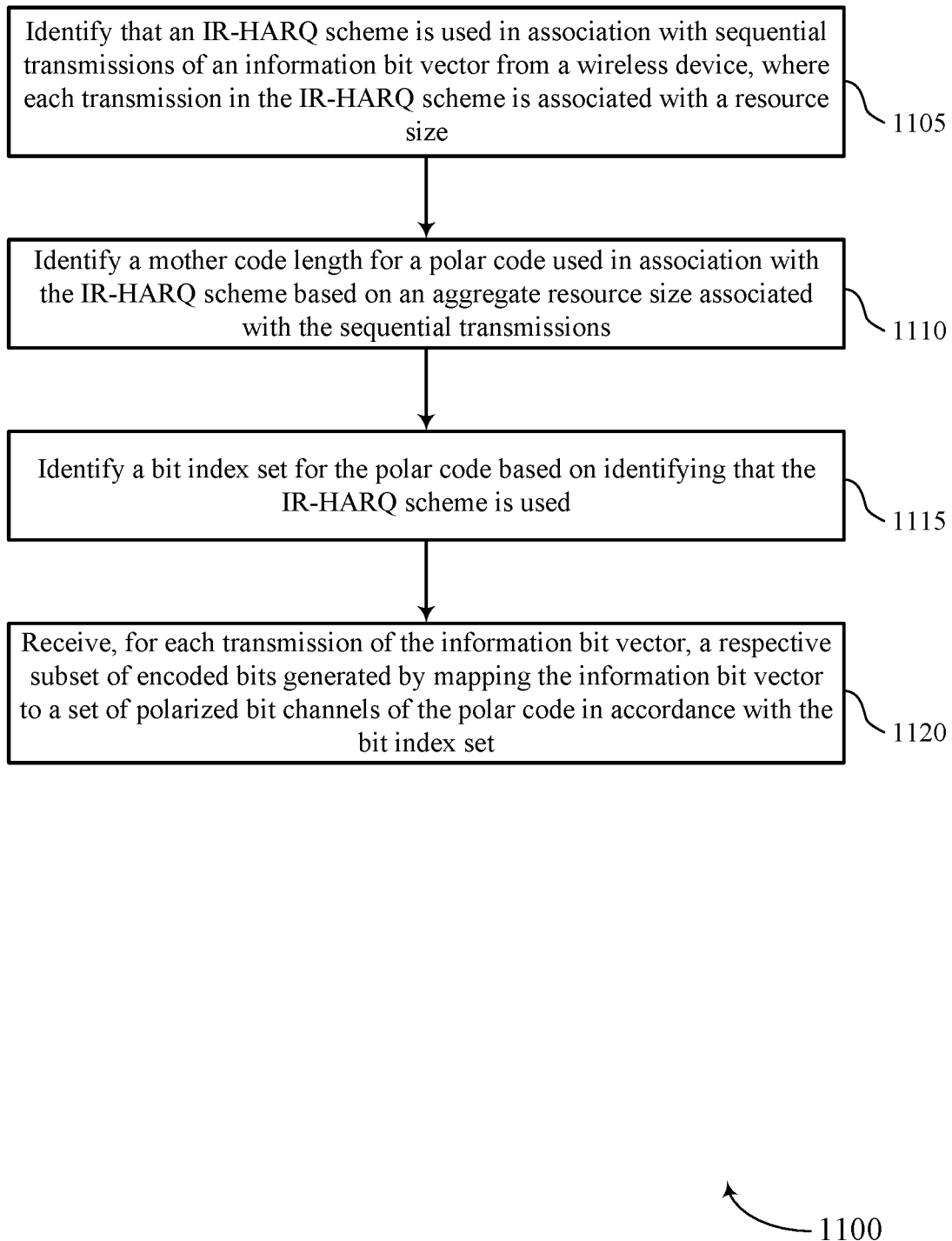
FIGS. 11 through 15 show flowcharts illustrating methods that support polar code construction for incremental redundancy in accordance with aspects of the present disclosure.

FIG. 11 shows a flowchart illustrating a method 1100 that supports polar code construction for incremental redundancy in accordance with aspects of the present disclosure. The operations of method 1100 may be implemented by a device or its components as described herein. For example, the operations of method 1100 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1105, the device may identify that an IR-HARQ scheme is used in association with sequential transmissions of an information bit vector from a wireless device, where each transmission in the IR-HARQ scheme is associated with a resource size. The operations of 1105 may be performed according to the methods described herein. In some examples, aspects of the operations of 1105 may be performed by a redundancy manager as described with reference to FIGS. 7 through 10.

At 1110, the device may identify a mother code length for a polar code used in association with the IR-HARQ scheme based on an aggregate resource size associated with the sequential transmissions. The operations of 1110 may be performed according to the methods described herein. In some examples, aspects of the operations of 1110 may be performed by a resource manager as described with reference to FIGS. 7 through 10.

At 1115, the device may identify a bit index set for the polar code based on the IR-HARQ scheme. The operations of 1115 may be performed according to the methods described herein. In some examples, aspects of the operations of 1115 may be performed by a polar code manager as described with reference to FIGS. 7 through 10.

At 1120, the device may receive, for each transmission of the information bit vector, a respective subset of encoded bits generated by mapping the information bit vector to a set of polarized bit channels of the polar code in accordance with the bit index set. The operations of 1120 may be performed according to the methods described herein. In some examples, aspects of the operations of 1120 may be performed by an information manager as described with reference to FIGS. 7 through 10.

Figure 12:
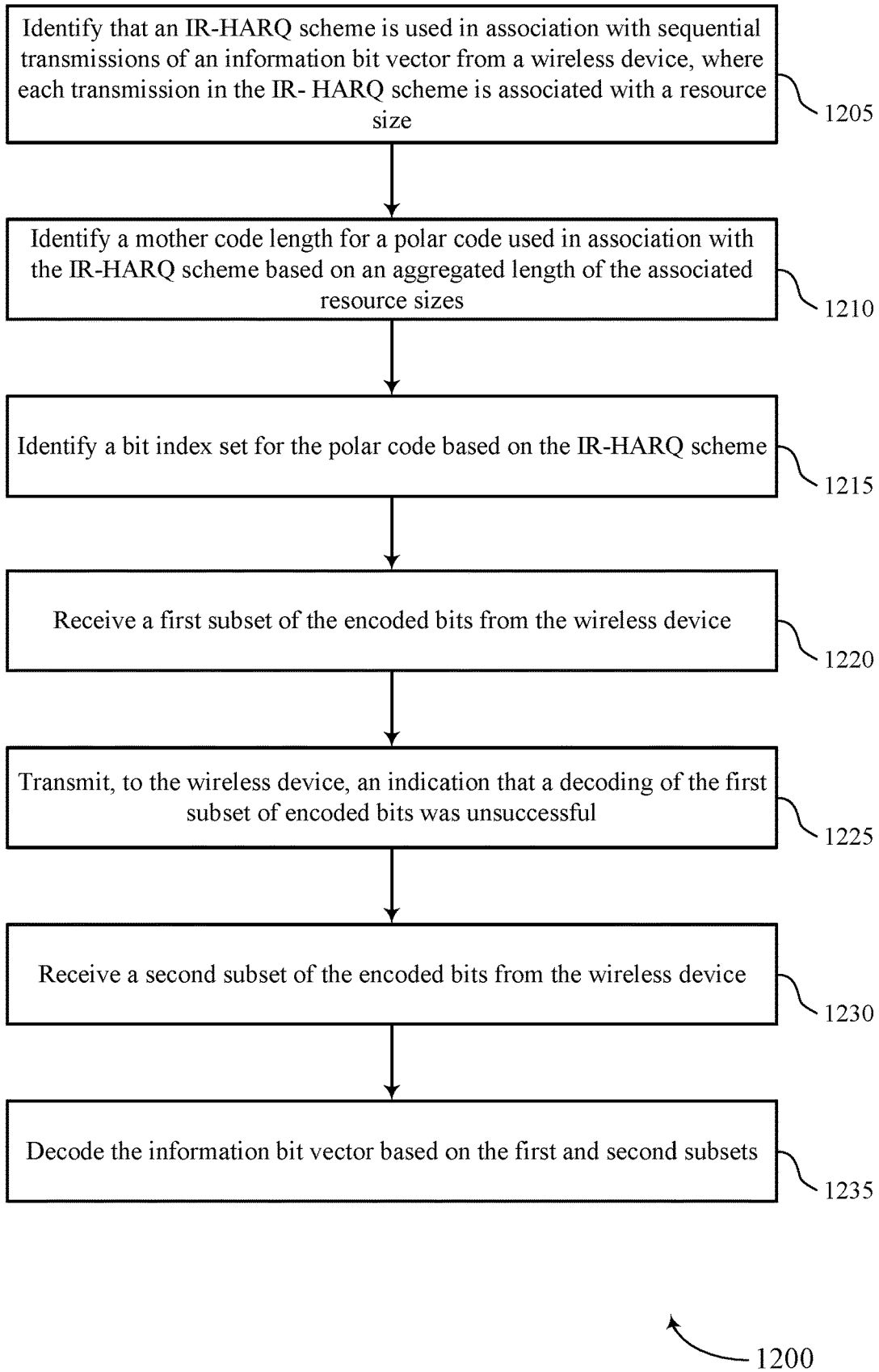

FIG. 12 shows a flowchart illustrating a method 1200 that supports polar code construction for incremental redundancy in accordance with aspects of the present disclosure. The operations of method 1200 may be implemented by a device or its components as described herein. For example, the operations of method 1200 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1205, the device may identify that an IR-HARQ scheme is used in association with sequential transmissions of an information bit vector from a wireless device, where each transmission in the IR-HARQ scheme is associated with a resource size. The operations of 1205 may be performed according to the methods described herein. In some examples, aspects of the operations of 1205 may be performed by a redundancy manager as described with reference to FIGS. 7 through 10.

At 1210, the device may identify a mother code length for a polar code used in association with the IR-HARQ scheme based on an aggregate resource size associated with the sequential transmissions. The operations of 1210 may be performed according to the methods described herein. In some examples, aspects of the operations of 1210 may be performed by a resource manager as described with reference to FIGS. 7 through 10.

At 1215, the device may identify a bit index set for the polar code based on the IR-HARQ scheme. The operations of 1215 may be performed according to the methods described herein. In some examples, aspects of the operations of 1215 may be performed by a polar code manager as described with reference to FIGS. 7 through 10.

At 1220, the device may receive a first subset of the encoded bits from the wireless device. The operations of 1220 may be performed according to the methods described herein. In some examples, aspects of the operations of 1220 may be performed by an information manager as described with reference to FIGS. 7 through 10.

At 1225, the device may transmit, to the wireless device, an indication that a decoding of the first subset of encoded bits was unsuccessful. The operations of 1225 may be performed according to the methods described herein. In some examples, aspects of the operations of 1225 may be performed by a feedback manager as described with reference to FIGS. 7 through 10.

At 1230, the device may receive a second subset of the encoded bits from the wireless device. The operations of 1230 may be performed according to the methods described herein. In some examples, aspects of the operations of 1230 may be performed by an information manager as described with reference to FIGS. 7 through 10.

At 1235, the device may decode the information bit vector based on the first and second subsets. The operations of 1235 may be performed according to the methods described herein. In some examples, aspects of the operations of 1235 may be performed by an information manager as described with reference to FIGS. 7 through 10.

Figure 13:
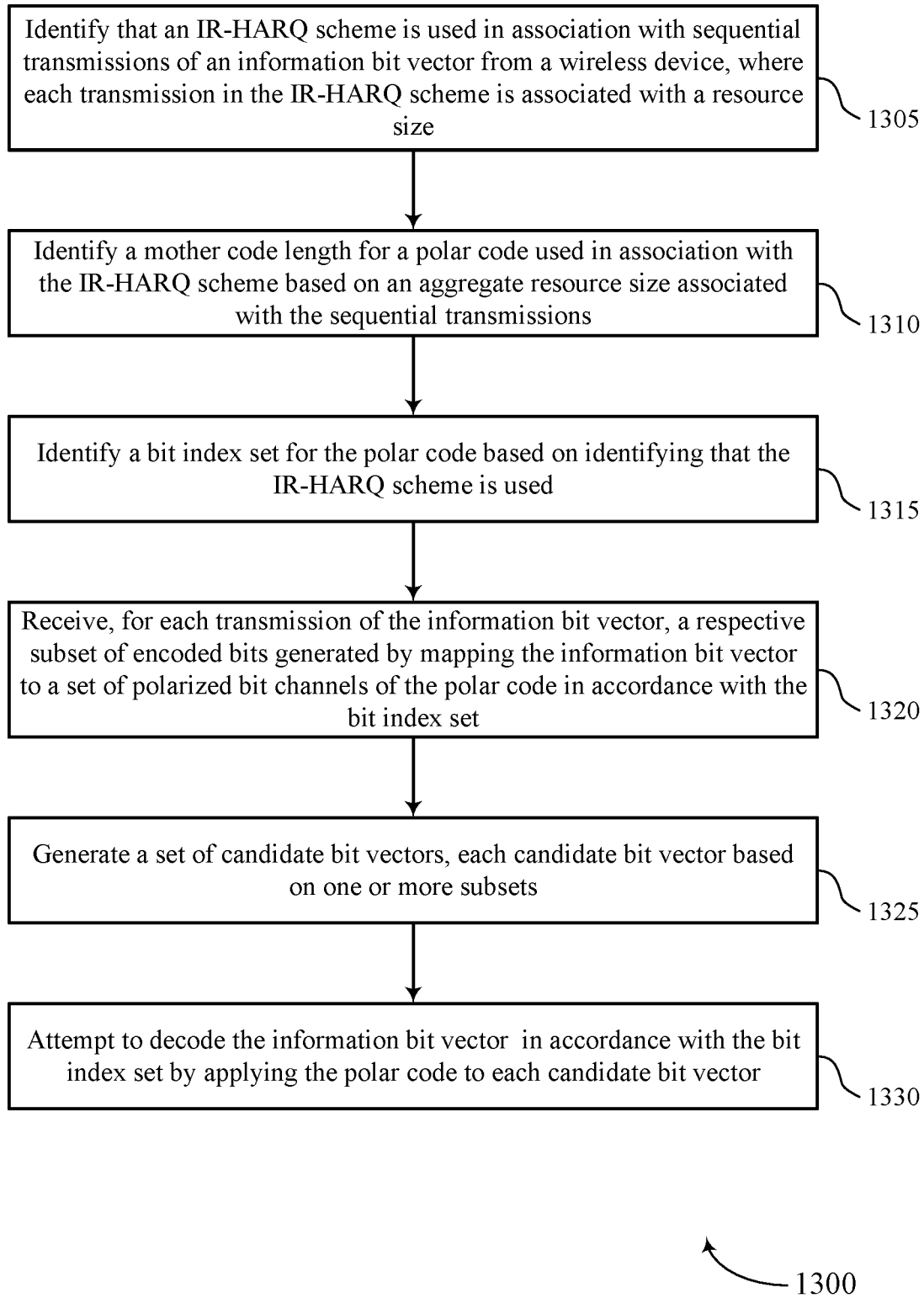

FIG. 13 shows a flowchart illustrating a method 1300 that supports polar code construction for incremental redundancy in accordance with aspects of the present disclosure. The operations of method 1300 may be implemented by a device or its components as described herein. For example, the operations of method 1300 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1305, the device may identify that an IR-HARQ scheme is used in association with sequential transmissions of an information bit vector from a wireless device, where each transmission in the IR-HARQ scheme is associated with a resource size. The operations of 1305 may be performed according to the methods described herein. In some examples, aspects of the operations of 1305 may be performed by a redundancy manager as described with reference to FIGS. 7 through 10.

At 1310, the device may identify a mother code length for a polar code used in association with the IR-HARQ scheme based on an aggregate resource size associated with the sequential transmissions. The operations of 1310 may be performed according to the methods described herein. In some examples, aspects of the operations of 1310 may be performed by a resource manager as described with reference to FIGS. 7 through 10.

At 1315, the device may identify a bit index set for the polar code based on the IR-HARQ scheme. The operations of 1315 may be performed according to the methods described herein. In some examples, aspects of the operations of 1315 may be performed by a polar code manager as described with reference to FIGS. 7 through 10.

At 1320, the device may receive, for each transmission of the information bit vector, a respective subset of encoded bits generated by mapping the information bit vector to a set of polarized bit channels of the polar code in accordance with the bit index set. The operations of 1320 may be performed according to the methods described herein. In some examples, aspects of the operations of 1320 may be performed by an information manager as described with reference to FIGS. 7 through 10.

At 1325, the device may generate a set of candidate bit vectors, each candidate bit vector based on one or more subsets. The operations of 1325 may be performed according to the methods described herein. In some examples, aspects of the operations of 1325 may be performed by an information manager as described with reference to FIGS. 7 through 10.

At 1330, the device may attempt to decode the information bit vector in accordance with the bit index set by applying the polar code to each candidate bit vector. The operations of 1330 may be performed according to the methods described herein. In some examples, aspects of the operations of 1330 may be performed by an information manager as described with reference to FIGS. 7 through 10.

Figure 14:
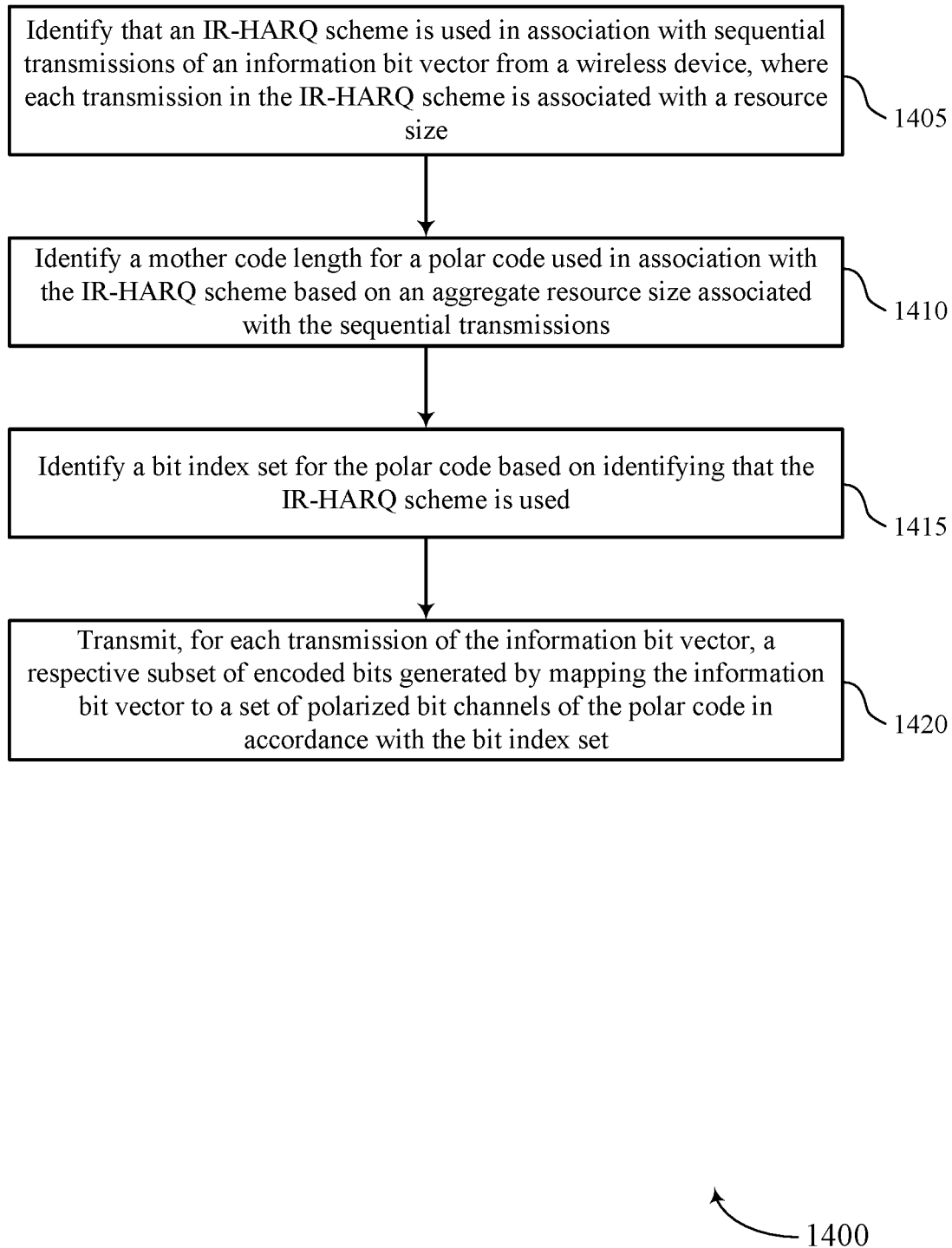

FIG. 14 shows a flowchart illustrating a method 1400 that supports polar code construction for incremental redundancy in accordance with aspects of the present disclosure. The operations of method 1400 may be implemented by a device or its components as described herein. For example, the operations of method 1400 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1405, the device may identify that an IR-HARQ scheme is used in association with sequential transmissions of an information bit vector to a wireless device, where each transmission in the IR-HARQ scheme is associated with a resource size. The operations of 1405 may be performed according to the methods described herein. In some examples, aspects of the operations of 1405 may be performed by a redundancy manager as described with reference to FIGS. 7 through 10.

At 1410, the device may identify a mother code length for a polar code used in association with the IR-HARQ scheme based on an aggregate resource size associated with the sequential transmissions. The operations of 1410 may be performed according to the methods described herein. In some examples, aspects of the operations of 1410 may be performed by a resource manager as described with reference to FIGS. 7 through 10.

At 1415, the device may identify a bit index set for the polar code based on the IR-HARQ scheme. The operations of 1415 may be performed according to the methods described herein. In some examples, aspects of the operations of 1415 may be performed by a polar code manager as described with reference to FIGS. 7 through 10.

At 1420, the device may transmit, for each transmission of the information bit vector, a respective subset of encoded bits generated by mapping the information bit vector to a set of polarized bit channels of the polar code in accordance with the bit index set. The operations of 1420 may be performed according to the methods described herein. In some examples, aspects of the operations of 1420 may be performed by an information manager as described with reference to FIGS. 7 through 10.

Figure 15:
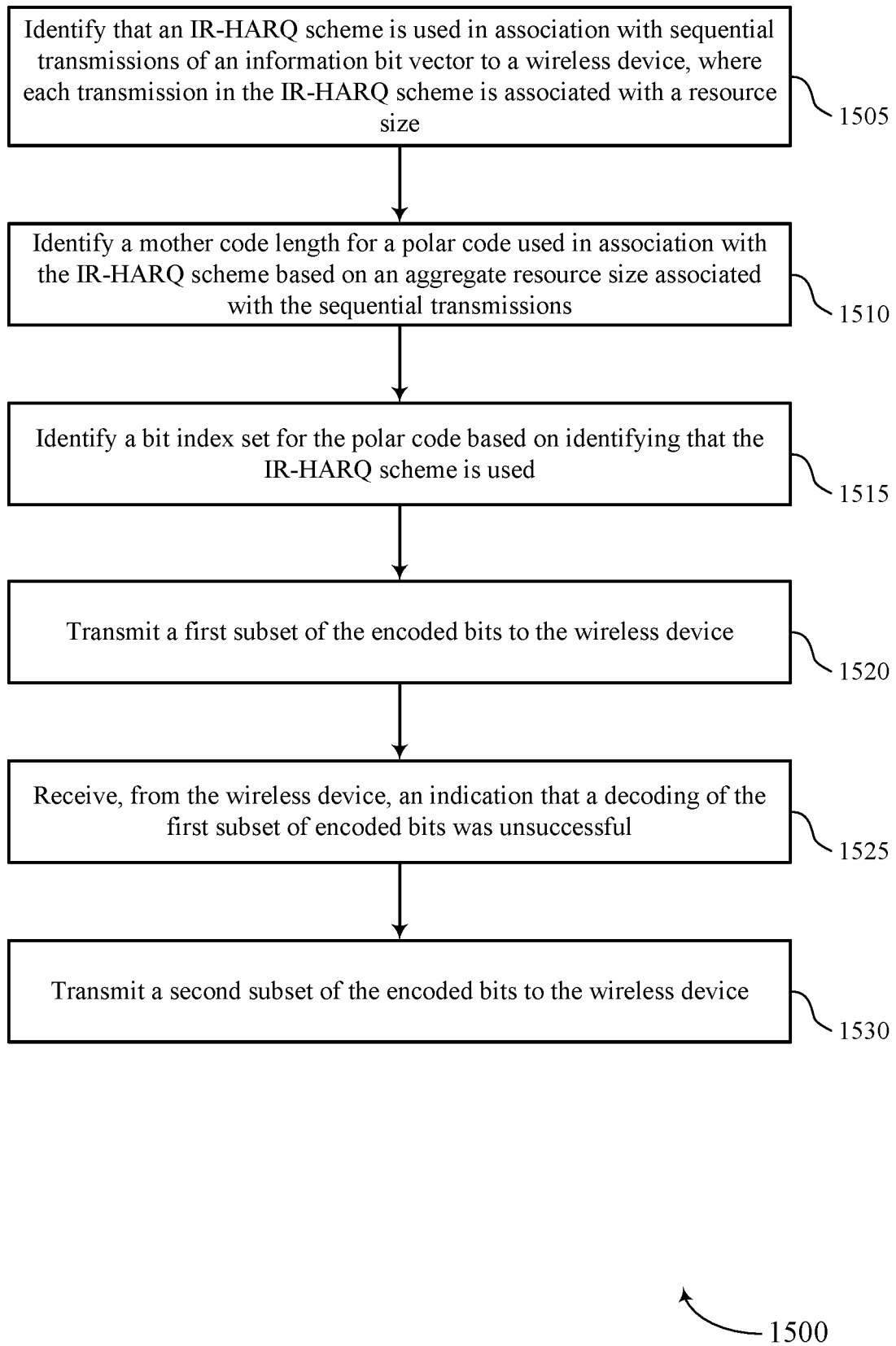

FIG. 15 shows a flowchart illustrating a method 1500 that supports polar code construction for incremental redundancy in accordance with aspects of the present disclosure. The operations of method 1500 may be implemented by a device or its components as described herein. For example, the operations of method 1500 may be performed by a communications manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1505, the device may identify that an IR-HARQ scheme is used in association with sequential transmissions of an information bit vector to a wireless device, where each transmission in the IR-HARQ scheme is associated with a resource size. The operations of 1505 may be performed according to the methods described herein. In some examples, aspects of the operations of 1505 may be performed by a redundancy manager as described with reference to FIGS. 7 through 10.

At 1510, the device may identify a mother code length for a polar code used in association with the IR-HARQ scheme based on an aggregate resource size associated with the sequential transmissions. The operations of 1510 may be performed according to the methods described herein. In some examples, aspects of the operations of 1510 may be performed by a resource manager as described with reference to FIGS. 7 through 10.

At 1515, the device may identify a bit index set for the polar code based on the IR-HARQ scheme. The operations of 1515 may be performed according to the methods described herein. In some examples, aspects of the operations of 1515 may be performed by a polar code manager as described with reference to FIGS. 7 through 10.

At 1520, the device may transmit a first subset of the encoded bits to the wireless device. The operations of 1520 may be performed according to the methods described herein. In some examples, aspects of the operations of 1520 may be performed by an information manager as described with reference to FIGS. 7 through 10.

At 1525, the device may receive, from the wireless device, an indication that a decoding of the first subset of encoded bits was unsuccessful. The operations of 1525 may be performed according to the methods described herein. In some examples, aspects of the operations of 1525 may be performed by a feedback manager as described with reference to FIGS. 7 through 10.

At 1530, the device may transmit a second subset of the encoded bits to the wireless device. The operations of 1530 may be performed according to the methods described herein. In some examples, aspects of the operations of 1530 may be performed by an information manager as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB.

An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying that an incremental redundancy hybrid automatic repeat request (IR-HARQ) scheme is used in association with sequential transmissions of an information bit vector from a wireless device, wherein each transmission in the IR-HARQ scheme is associated with a resource size;

identifying a mother code length for a polar code used in association with the IR-HARQ scheme based on an aggregate resource size associated with the sequential transmissions and a payload;

identifying a bit index set based at least in part on a reference bit index set corresponding to the mother code length based at least in part on the payload for the polar code based on identifying that the IR-HARQ scheme is used, wherein at least a portion of bits of the bit index set are associated with bit positions of the polar code; and receiving, for each transmission of the information bit vector, a respective subset of encoded bits generated by mapping the information bit vector to a set of polarized bit channels of the polar code in accordance with the bit index set.

2. The method of claim 1, wherein identifying the bit index set for the polar code comprises:
selecting the bit index set from a plurality of candidate bit index sets based on a vector length of the information bit vector, the mother code length, or a combination thereof.

3. The method of claim 1, wherein receiving, for each transmission of the information bit vector, the respective subset of encoded bits comprises:
receiving a first subset of the encoded bits from the wireless device;
transmitting, to the wireless device, an indication that a decoding of the first subset of encoded bits was unsuccessful;
receiving a second subset of the encoded bits from the wireless device; and
decoding the information bit vector based on the first and second subsets.

4. The method of claim 1, further comprising:
generating a plurality of candidate bit vectors, each candidate bit vector based on one or more subsets; and
attempting to decode the information bit vector in accordance with the bit index set by applying the polar code to each candidate bit vector.

5. The method of claim 1, wherein identifying that the IR-HARQ scheme is used in association with sequential transmission of the information bit vector comprises:
identifying a number of HARQ processes supported by the IR-HARQ scheme, wherein the aggregate resource size associated with the sequential transmissions is based on the number of HARQ processes.

6. The method of claim 1, wherein the bit index set is based on a plurality of reference bit index sets, each reference bit index set corresponding to a respective mother code length that is based on the resource size of one or more of the transmissions.

7. The method of claim 6, wherein the bit index set comprises a common set of bit indices that is common to each of the plurality of reference bit index sets and a distribution of bit indices from difference sets, each difference set specific to a respective reference bit index set of the plurality of reference bit index sets.

8. The method of claim 7, wherein the common set of bit indices is identified based on normalizing each of the plurality of reference bit index sets to have a same set size.

9. The method of claim 7, wherein the distribution of bit indices from the difference sets is based on a priority ranking of the sequential transmissions.

10. The method of claim 6, wherein a first reference bit index set corresponds to a first mother code length that is based on the resource size associated with a first transmission and a second reference bit index set corresponds to a second mother code length that is based on an aggregation of the resource size associated with the first transmission and the resource size associated with a second transmission.

11. The method of claim 6, further comprising:
identifying a resource size associated with a first transmission and a number of bits in the information bit vector; and
identifying a first reference bit index set corresponding to a first mother code length based on the resource size and the number of bits in the information bit vector.

12. The method of claim 1, further comprising:
identifying a communication type associated with the information bit vector, wherein the bit index set is based on the communication type.

13. The method of claim 1, wherein a first subset of the encoded bits has a same bit length as a second subset of the encoded bits.

14. The method of claim 1, wherein the resource size associated with a first transmission is different from the resource size associated with a second transmission.

15. A method for wireless communication, comprising:
identifying that an incremental redundancy hybrid automatic repeat request (IR-HARQ) scheme is used in association with sequential transmissions of an information bit vector to a wireless device, wherein each transmission in the IR-HARQ scheme is associated with a resource size;
identifying a mother code length for a polar code used in association with the IR-HARQ scheme based on an aggregate resource size associated with the sequential transmissions and a payload;
identifying a bit index set based at least in part on a reference bit index set corresponding to the mother code length based at least in part on the payload for the polar code based on identifying that the IR-HARQ scheme is used, wherein at least a portion of bits of the bit index set are associated with bit positions of the polar code; and
transmitting, for each transmission of the information bit vector, a respective subset of encoded bits generated by mapping the information bit vector to a set of polarized bit channels of the polar code in accordance with the bit index set.

16. The method of claim 15, wherein identifying the bit index set for the polar code comprises:
selecting the bit index set from a plurality of candidate bit index sets based on a vector length of the information bit vector, the mother code length, or a combination thereof.

17. The method of claim 15, wherein transmitting, for each transmission of the information bit vector, the respective subset of encoded bits comprises:
transmitting a first subset of the encoded bits to the wireless device;
receiving, from the wireless device, an indication that a decoding of the first subset of encoded bits was unsuccessful; and
transmitting a second subset of the encoded bits to the wireless device.

18. The method of claim 15, wherein transmitting, for each transmission of the information bit vector, the respective subset of encoded bits comprises:

generating each subset of encoded bits by applying a respective puncturing pattern to the encoded bits.

19. The method of claim 15, wherein identifying that the IR-HARQ scheme is used in association with sequential transmission of the information bit vector comprises:
identifying a number of HARQ processes supported by the IR-HARQ scheme, wherein the aggregate resource size associated with the sequential transmissions is based on the number of HARQ processes.

20. The method of claim 15, wherein the bit index set is based on a plurality of reference bit index sets, each reference bit index corresponding to a respective mother code length that is based on the resource size of one or more of the transmissions.

21. The method of claim 20, wherein the bit index set comprises a common set of bit indices that is common to each of the plurality of reference bit index sets and a distribution of bit indices from difference sets, each difference set specific to a respective reference bit index set of the plurality of reference bit index sets.

22. The method of claim 21, wherein the common set of bit indices is identified based on normalizing each of the plurality of reference bit index sets to have a same set size.

23. The method of claim 21, wherein the distribution of bit indices from the difference sets is based on a priority ranking of the sequential transmissions.

24. The method of claim 20, wherein a first reference bit index set corresponds to a first mother code length that is based on the resource size associated with a first transmission and a second reference bit index set corresponds to a second mother code length that is based on an aggregation of the resource size associated with the first transmission and the resource size associated with a second transmission.

25. The method of claim 20, further comprising:
identifying a resource size associated with a first transmission and a number of bits in the information bit vector; and
identifying a first reference bit index set corresponding to a first polar code length based on the resource size and the number of bits in the information bit vector.

26. The method of claim 15, further comprising:
identifying a communication type associated with the information bit vector, wherein the bit index set is based on the communication type.

27. The method of claim 15, wherein a first subset of the encoded bits has a same bit length as a second subset of the encoded bits.

28. The method of claim 15, wherein the resource size associated with a first transmission is different from the resource size associated with a second transmission.

29. An apparatus for wireless communication, comprising:
a processor,
memory in electronic communication with the processor; and
instructions stored in the memory and executable by the processor to cause the apparatus to:
identify that an incremental redundancy hybrid automatic repeat request (IR-HARQ) scheme is used in association with sequential transmissions of an information bit vector from a wireless device, wherein each transmission in the IR-HARQ scheme is associated with a resource size;
identify a mother code length for a polar code used in association with the IR-HARQ scheme based on an aggregate resource size associated with the sequential transmissions and a payload;
identify a bit index set based at least in part on a reference bit index set corresponding to the mother code length based at least in part on the payload for the polar code based on the IR-HARQ scheme, wherein at least a portion of bits of the bit index set are associated with bit positions of the polar code; and
receive, for each transmission of the information bit vector, a respective subset of encoded bits generated by mapping the information bit vector to a set of polarized bit channels of the polar code in accordance with the bit index set.

30. An apparatus for wireless communication, comprising:
a processor,
memory in electronic communication with the processor; and
instructions stored in the memory and executable by the processor to cause the apparatus to:
identify that an incremental redundancy hybrid automatic repeat request (IR-HARQ) scheme is used in association with sequential transmissions of an information bit vector to a wireless device, wherein each transmission in the IR-HARQ scheme is associated with a resource size;
identify a mother code length for a polar code used in association with the IR-HARQ scheme based on an aggregate resource size associated with the sequential transmissions and a payload;
identify a bit index set based at least in part on a reference bit index set corresponding to the mother code length based at least in part on the payload for the polar code based on the IR-HARQ scheme, wherein at least a portion of bits of the bit index set are associated with bit positions of the polar code; and
transmit, for each transmission of the information bit vector, a respective subset of encoded bits generated by mapping the information bit vector to a set of polarized bit channels of the polar code in accordance with the bit index set.

* * * * *